(12) United States Patent
Ito et al.

(10) Patent No.: US 11,345,632 B2
(45) Date of Patent: May 31, 2022

(54) MANUFACTURING METHOD OF GLASS ARTICLE AND GLASS ARTICLE

(71) Applicant: AGC Inc., Chiyoda-ku (JP)

(72) Inventors: Jun Ito, Chiyoda-ku (JP); Ikuo Nagasawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 482 days.

(21) Appl. No.: 16/282,373

(22) Filed: Feb. 22, 2019

(65) Prior Publication Data

US 2019/0185376 A1    Jun. 20, 2019

Related U.S. Application Data

(63) Continuation of application No. PCT/JP2017/028070, filed on Aug. 2, 2017.

(30) Foreign Application Priority Data

Sep. 1, 2016    (JP) .............................. JP2016-171296

(51) Int. Cl.
*C03C 21/00* (2006.01)
*B23K 26/55* (2014.01)
(Continued)

(52) U.S. Cl.
CPC .......... *C03C 23/0025* (2013.01); *B23K 26/38* (2013.01); *B23K 26/55* (2015.10);
(Continued)

(58) Field of Classification Search
None
See application file for complete search history.

(56) References Cited

U.S. PATENT DOCUMENTS

| 10,029,940 B1 * | 7/2018 | Geerlings .............. B23K 26/53 |
| 2004/0144231 A1 | 7/2004 | Hanada |

(Continued)

FOREIGN PATENT DOCUMENTS

| JP | 2004-217492 A | 8/2004 |
| JP | 2008-308628 A | 12/2008 |

(Continued)

OTHER PUBLICATIONS

U.S. Appl. No. 16/538,895, filed Aug. 13, 2019, Jun Ito, et al.

(Continued)

*Primary Examiner* — Erin Snelting
(74) *Attorney, Agent, or Firm* — Oblon, McClelland, Maier & Neustadt, L.L.P.

(57) ABSTRACT

A manufacturing method of a glass article having an organic film includes irradiating a first main surface of a glass plate having the first main surface and a second main surface, opposite each other, with a laser light of a first laser, to form an in-plane void region, in which voids are arrayed, on the first main surface, and internal void arrays, including voids arrayed from the in-plane void region to the second main surface, in the glass plate; depositing the organic film on the first main surface or the second main surface of the glass plate; and irradiating and scanning the first main surface or the second main surface, on which the organic film was deposited, with a laser light of a second laser, along the in-plane void region, to separate the glass article from the glass plate along the in-plane void region.

6 Claims, 8 Drawing Sheets

(51) Int. Cl.
*C03B 33/09* (2006.01)
*B23K 26/38* (2014.01)
*C03C 17/30* (2006.01)
*C03B 33/02* (2006.01)
*C03C 23/00* (2006.01)
*C03C 17/32* (2006.01)

(52) U.S. Cl.
CPC .......... *C03B 33/0222* (2013.01); *C03B 33/09* (2013.01); *C03C 17/30* (2013.01); *C03C 17/32* (2013.01); *C03C 21/00* (2013.01); *C03C 21/002* (2013.01)

(56) References Cited

U.S. PATENT DOCUMENTS

| | | |
|---|---|---|
| 2006/0246302 A1 | 11/2006 | Brady et al. |
| 2009/0040640 A1* | 2/2009 | Kim ........................ B23K 26/40 359/894 |
| 2009/0197048 A1* | 8/2009 | Amin ....................... C03C 17/30 428/142 |
| 2012/0047957 A1 | 3/2012 | Dannoux et al. |
| 2012/0135847 A1 | 5/2012 | Fukasawa et al. |
| 2012/0196071 A1 | 8/2012 | Cornejo et al. |
| 2013/0068505 A1 | 3/2013 | Hong et al. |
| 2013/0126573 A1 | 5/2013 | Hosseini et al. |
| 2014/0027951 A1 | 1/2014 | Srinivas et al. |
| 2014/0057051 A1* | 2/2014 | Kato ........................ B05D 5/083 427/255.6 |
| 2014/0083983 A1 | 3/2014 | Zhang et al. |
| 2014/0147623 A1* | 5/2014 | Shorey .................. C03B 33/102 428/137 |
| 2014/0147624 A1 | 5/2014 | Streltsov et al. |
| 2014/0151370 A1 | 6/2014 | Chang et al. |
| 2014/0239552 A1* | 8/2014 | Srinivas ............... B23K 26/354 264/400 |
| 2014/0340730 A1* | 11/2014 | Bergh ................. B32B 17/1055 359/275 |
| 2015/0140735 A1* | 5/2015 | Hosseini ............ B23K 26/0624 438/107 |
| 2015/0165548 A1* | 6/2015 | Marjanovic ............ B23K 26/02 428/43 |
| 2015/0166393 A1 | 6/2015 | Marjanovic et al. |
| 2015/0235869 A1 | 8/2015 | Uehara |
| 2015/0275046 A1* | 10/2015 | Yamane ............... C08G 65/336 428/429 |
| 2016/0009586 A1 | 1/2016 | Bookbinder et al. |
| 2016/0016257 A1 | 1/2016 | Hosseini |
| 2016/0059359 A1 | 3/2016 | Krueger et al. |
| 2016/0060156 A1 | 3/2016 | Krueger et al. |
| 2016/0200621 A1 | 7/2016 | N'Gom et al. |
| 2016/0318796 A1 | 11/2016 | Masuda |
| 2017/0174565 A1 | 6/2017 | Kase et al. |
| 2017/0197868 A1 | 7/2017 | Gupta et al. |
| 2018/0062342 A1* | 3/2018 | Comstock, II ..... B23K 26/0665 |
| 2018/0186677 A1* | 7/2018 | Ito ....................... C03B 33/0222 |

FOREIGN PATENT DOCUMENTS

| | | |
|---|---|---|
| JP | 2009-120727 A | 6/2009 |
| JP | 2009-539743 | 11/2009 |
| JP | 2011-510904 A | 4/2011 |
| JP | 2012-526721 | 11/2012 |
| JP | 2013-536081 A | 9/2013 |
| JP | 2014-65624 A | 4/2014 |
| JP | 2014-531391 A | 11/2014 |
| JP | 2014-224892 A | 12/2014 |
| JP | 2015-156427 A | 8/2015 |
| JP | 2015-196716 A | 11/2015 |
| JP | 2015-534601 A | 12/2015 |
| JP | 2016-506351 | 3/2016 |
| TW | 201433554 A | 9/2014 |
| WO | WO 2009/084398 A1 | 7/2009 |
| WO | WO 2011/002089 A1 | 1/2011 |
| WO | WO 2011/037167 A1 | 3/2011 |
| WO | WO 2012/153781 A1 | 11/2012 |
| WO | WO 2014/050798 A1 | 4/2014 |
| WO | WO 2014/161535 A2 | 10/2014 |
| WO | WO 2015/079849 A1 | 6/2015 |
| WO | WO 2015/080043 A1 | 6/2015 |
| WO | WO 2015/113024 A1 | 7/2015 |
| WO | WO 2015/113026 A2 | 7/2015 |
| WO | WO 2017/038853 A1 | 3/2017 |

OTHER PUBLICATIONS

U.S. Appl. No. 16/538,901, filed Aug. 13, 2019, Jun Ito, et al.
U.S. Appl. No. 15/909,291, filed Mar. 1, 2018, US-2018-0186677-A1, Jun Ito, et al.
International Search Report dated Oct. 31, 2017 in PCT/JP2017/028070 filed Aug. 2, 2017 (with English Translation).
Written Opinion dated Oct. 31, 2017 in PCT/JP2017/028070 filed Aug. 2, 2017.
European Office Action dated Apr. 30, 2021 in European Patent Application No. 18756881.1, 3 pages.
International Search Report (with English translation) and Written Opinion dated Dec. 6, 2016, in PCT/JP2016/075475, 7 pages.
Office Action dated Sep. 19, 2019, in co-pending U.S. Appl. No. 15/909,291, 12 pages.
Restriction requirement dated May 21, 2019, in co-pending U.S. Appl. No. 15/909,291, 7 pages.
International Search Report (with English translation) and Written Opinion dated Oct. 11, 2016, in PCT/JP2016/075415, 7 pages.
International Search Report (with English translation) and Written Opinion dated Mar. 6, 2018, in PCT/JP2018/002938, 7 pages.
International Search Report (with English translation) and Written Opinion dated Mar. 6, 2018, in PCT/JP2018/002937, 7 pages.

\* cited by examiner

MANUFACTURING METHOD OF GLASS ARTICLE AND GLASS ARTICLE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/028070 filed on Aug. 2, 2017 and designating the U.S., which claims priority of Japanese Patent Application No. 2016-171296 filed on Sep. 1, 2016. The entire contents of the foregoing applications are incorporated herein by reference.

BACKGROUND OF THE INVENTION

1. Field of the Invention

The disclosure herein generally relates to a manufacturing method of a glass article having an organic film, and a glass article having an organic film.

2. Description of the Related Art

In manufacturing processes of various glass articles, a step of separating and obtaining a glass article or two or more glass articles from a large-sized glass plate, a so-called separation step, may be often required.

In such a separation step, an operation of forming a scribe line by machining at a specified position in a main surface of a glass plate, and applying a bending moment to the glass plate along the scribe line, to cut the glass plate, is often performed.

Moreover, recently, a method of irradiating a glass plate with a laser light of a $CO_2$ laser that is a gas laser, and fusion cutting the glass plate into a specified size with an incident heat from the laser light of the $CO_2$ laser, to separate and obtain a glass article, has been proposed (See, for example, Japanese Translation of PCT international application publication No. 2012-526721). Note that another method of separating and obtaining a glass article includes a method using a gas laser such as an excimer laser, an argon (Ar) laser or a helium (He)-neon (Ne) laser, a solid-state laser such as a YAG laser, a semiconductor laser, or a free electron laser.

SUMMARY OF THE INVENTION

Technical Problem

As described above, a method of separating a glass article from a glass plate, by irradiating the glass plate with a laser light, and fusion cutting the glass plate at a specified position, has been known.

However, among the glass articles, there exist many glass articles having a variety of organic films on their main surfaces. For example, when cover glasses for mobile electronic devices are manufactured, organic films such as anti-fingerprint (AFP) films may be arranged on glass plates. When the separation step, as disclosed in Japanese Translation of PCT international application publication No. 2012-526721, is performed for glass plates having such organic films, there is a problem that the organic films may be damaged by incident heat from a laser light, particularly at end faces.

Note that in order to deal with the problem, after separating a glass substrate from a glass plate, an organic film may be deposited on a surface of the separated glass substrate.

However, in such a method, it is necessary to handle many glass substrates in the deposition step, and the step becomes complicated. Then, the manufacturing efficiency for the glass articles is reduced. Thus, the method is not a fundamental solution for the aforementioned problem.

The present invention was made in view of such a problem, and it is an object of the present invention to provide a manufacturing method of a glass article, in which an organic film arranged on a main surface can be prevented from being damaged significantly, when the glass article is separated from a glass plate. Moreover, it is an object of the present invention to provide a glass article, in which an organic film is prevented from being damaged significantly.

Solution to Problem

According to an aspect of the present invention, a manufacturing method of a glass article having an organic film including a step (1) of irradiating a first main surface of a glass plate having the first main surface and a second main surface, opposite each other, with a laser light of a first laser, to form an in-plane void region, in which a plurality of voids are arrayed, on the first main surface, and to form a plurality of internal void arrays, each including a void or two or more voids arrayed from the in-plane void region to the second main surface, in the glass plate;

a step (2) of depositing the organic film on the first main surface or the second main surface of the glass plate; and a step (3) of irradiating and scanning the first main surface or the second main surface of the glass plate, on which the organic film was deposited, with a laser light of a second laser that is different from the first laser, along the in-plane void region or a neighborhood of the in-plane void region, to separate one glass article or two or more glass articles from the glass plate along the in-plane void region, in the step (3), the first main surface or the second main surface being irradiated with the laser light of the second laser so that when a central portion of a surface of the organic film of the separated glass article on the first main surface side is MC, and a point in an end face of the glass article in a top view is MP (in a case where the glass article has an approximately polygonal shape, MP is a point in the end face other than intersection portions of two adjacent sides of a polygon), at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and at the central portion MC, a count number for fluorine and a count number for silicon obtained by the X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$, a ratio of the ratio $R_{MP}$ to the ratio $R_{MC}$ is 0.3 or more, is provided.

Moreover, according to an another aspect of the present invention, a manufacturing method of a glass article having an organic film including a step (1) of depositing the organic film on a first main surface of a glass plate having the first main surface and a second main surface, opposite each other;

a step (2) of irradiating the first main surface of the glass plate with a laser light of a first laser, to form an in-plane void region, in which a plurality of voids are arrayed, on the first main surface, and to form a plurality of internal void arrays, each including a void or two or more voids arrayed from the in-plane void region to the second main surface, in the glass plate; and a step (3) of irradiating and scanning the first main surface of the glass plate with a laser light of a second laser that is different from the first laser, along the in-plane void region or a neighborhood of the in-plane void region, to separate one glass article or two or more glass articles from the glass plate along the in-plane void region, in the step (3), the first main surface being irradiated with the laser light of the second laser so that when a central portion of a surface of the organic film of the separated glass article on the first main surface side is MC, and a point in an end face of the glass article in a top view is MP (in a case where the glass article has an approximately polygonal shape, MP is a point in the end face other than intersection portions of two adjacent sides of a polygon), at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and at the central portion MC, a count number for fluorine and a count number for silicon obtained by the X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$, a ratio of the ratio $R_{MP}$ to the ratio $R_{MC}$ is 0.3 or more, is provided.

Furthermore, according to a yet another aspect of the present invention, a glass article including a glass substrate having a first main surface and a second main surface, opposite each other, and an end face; and an organic film arranged on the first main surface of the glass substrate, when a central portion of a surface of the organic film on the first main surface side is MC, and a point in the end face in a top view is MP (in a case where the first main surface has an approximately polygonal shape, MP is a point in the end face other than intersection portions of two adjacent sides of a polygon), at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and at the central portion MC, a count number for fluorine and a count number for silicon obtained by the X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$, a ratio of the ratio $R_{MP}$ to the ratio $R_{MC}$ being 0.3 or more, is provided.

Effect of Invention

According to an aspect of the present invention, a manufacturing method of a glass article, in which an organic film arranged on a main surface can be prevented from being damaged significantly, when the glass article is separated from a glass plate, can be provided. Moreover, according to another aspect of the present invention, a glass article, in which an organic film is prevented from being damaged significantly, can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, embodiments for implementing the present invention will be described with reference to the accompanying drawings.

(Manufacturing Method of a Glass Article According to an Embodiment of the Present Invention)

With reference to FIGS. 1 to 11, a manufacturing method of a glass article according to an embodiment of the present invention will be described.

Figure 1:
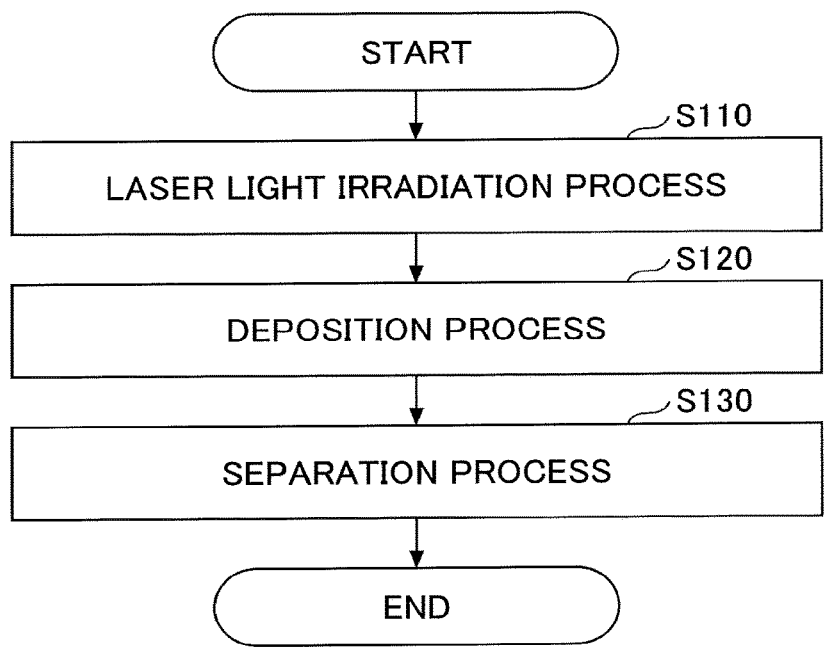
FIG. 1 is a flowchart schematically depicting an example of a flow of a manufacturing method of a glass article according to an embodiment of the present invention.

FIG. 1 is a flowchart schematically depicting an example of a flow of the manufacturing method of the glass article according to the embodiment of the present invention (in the following, will be referred to as a "first manufacturing method").

As illustrated in FIG. 1, the first manufacturing method includes:

a laser irradiation step (1) of, in a glass plate having a first main surface and a second main surface, opposite each other, irradiating the first main surface of the glass plate with a laser light of a first laser (step S110);

a deposition step (2) of depositing an organic film on the first main surface or the second main surface of the glass plate (step S120); and a separation step (3) of irradiating the main surface of the glass plate, on which the organic film was deposited, with a laser light of a second laser that is different from the first laser, to separate one glass article or two or more glass articles from the glass plate (step S130).

In the following, with reference to FIGS. 2 to 11, the processes will be described. Note that FIGS. 2 to 11 are diagrams schematically depicting the steps of the first manufacturing method.

(Step S110)

First, a glass plate having a first main surface and a second main surface, opposite each other, is provided.

A glass composition of the glass plate is not particularly limited. For example, the glass plate may be configured of a soda lime glass, and an alkali aluminosilicate glass.

A thickness of the glass plate is not particularly limited. For example the thickness may fall within a range of 0.03 mm to 6 mm.

Figure 2:
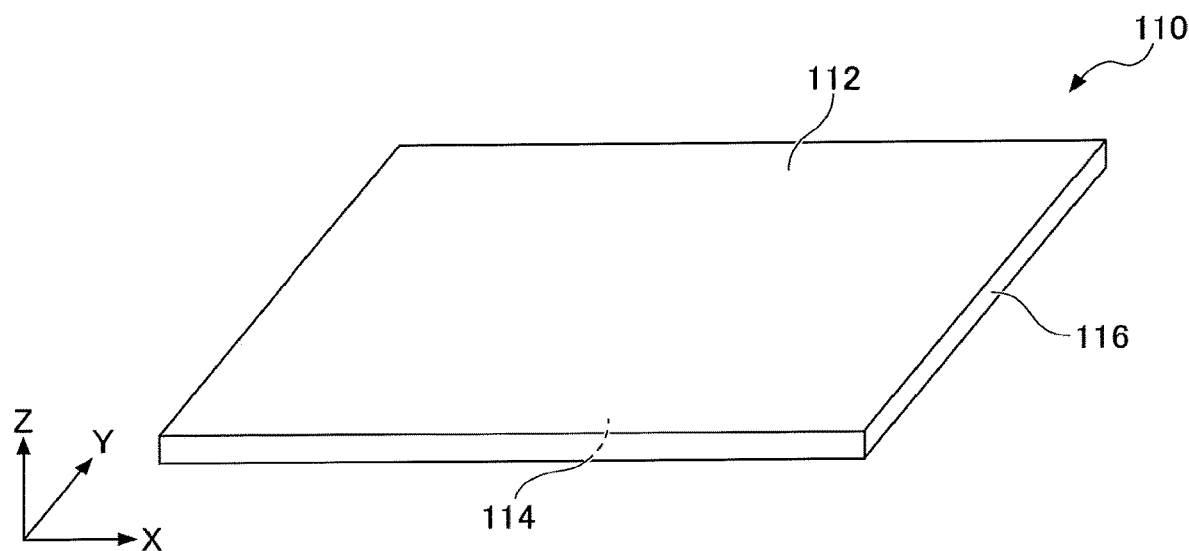
FIG. 2 is a diagram schematically depicting an example of a form of a glass plate that can be used in the manufacturing method of the glass article according to the embodiment of the present invention.

FIG. 2 is a diagram schematically depicting an example of a configuration of the glass plate 110. The glass plate 110 has a first main surface 112 and a second main surface 114, opposite each other, and an end face 116.

Note that a form of the glass plate 110 is not particularly limited. For example, the glass plate 110 may have various forms, in addition to an approximately rectangular shape, illustrated in FIG. 2, such as a polygonal shape, or an elliptical shape (including a circular shape).

Next, the glass plate 110 is irradiated with laser light of a first laser. Laser light of the first laser is emitted to one of the main surfaces of the glass plate 110 (in the following, assumed to be the first main surface 112, as an example). Note that it is necessary to pay attention to the point that the first laser used here is different from a $CO_2$ laser which may be used in the separation step (step S130), described later.

According to the irradiation with laser light of the first laser, on the first main surface 112 of the glass plate 110, an in-plane void region is formed. Moreover, below the in-plane void region, i.e. toward the second main surface 114, a plurality of internal void arrays are formed.

The "in-plane void region" means a region having a linear shape formed by arraying a plurality of surface voids in a predetermined arrangement. Moreover, the "internal void array" means a region having a linear shape inside the glass plate, formed by arraying a void or two or more voids from the first main surface 112 toward the second main surface 114.

Figure 3:
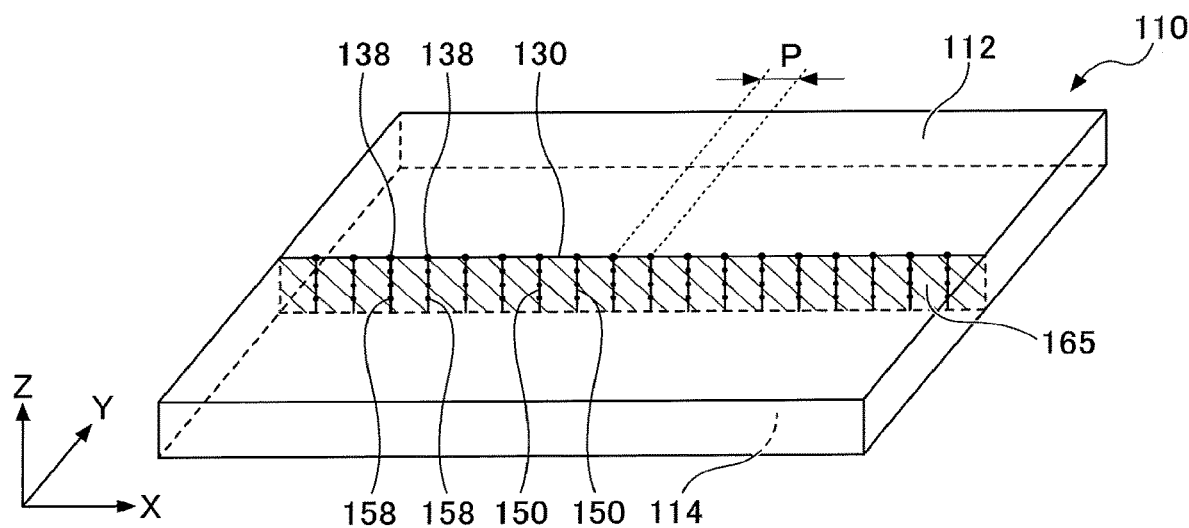
FIG. 3 is a diagram for schematically explaining a form of an in-plane void region and an internal void array.

In the following, with reference to FIG. 3, configurations of the "in-plane void region" and the "internal void array" will be described in more detail. FIG. 3 is a diagram schematically depicting the in-plane void region and the internal void array formed in the glass plate.

As illustrated in FIG. 3, in the glass plate 110, an in-plane void region 130 and a plurality of internal void arrays 150 corresponding to the in-plane void region 130 are formed.

As described above, the in-plane void region 130 means a region having a linear shape in which a plurality of surface voids 138 are arrayed in a predetermined arrangement. For example, in FIG. 3, a plurality of surface voids 138 are arrayed in a fixed direction (X-axis direction), and thereby the in-plane void region 130 are formed.

The surface void 138 corresponds to an irradiation position on the first main surface 112 with laser light of the first laser, and has a diameter that falls within a range from 1 µm to 5 µm. However, the diameter of the surface void 138 varies depending on irradiation conditions with laser light of the first laser, a type of the glass plate 110, and the like.

A distance between centers P of surface voids 138 adjacent to each other is optionally determined based on the composition and thickness of the glass plate 110, a laser process condition, or the like. For example the distance between centers P may fall within a range from 2 µm to 10 µm. Note that the distance between centers P of surface voids 138 is not required to be the same at all positions, and may be different depending on the position. That is the surface voids 138 may be arrayed at irregular intervals.

As described above, the internal void array 150 means a region having a linear shape formed by arraying a void or two or more voids 158 from the first main surface 112 toward the second main surface 114 inside the glass plate 110.

A shape, a dimension and a pitch of the void are not particularly limited. For example, the void 158 may have a shape of a circle, an ellipse, a rectangle or a triangle viewed from the Y-axis direction. Moreover, the greatest dimension of the void 158 viewed from the Y-axis direction (typically, corresponding to a length of the void 158 in the direction in which the internal void array 150 extends) may fall, for example, within a range from 0.1 µm to 1000 µm.

The surface void 138 configuring the in-plane void region 130 has an internal void array 150 which corresponds to the surface void 138. For example, in FIG. 3, 18 internal void arrays 150 are formed correspondingly to 18 surface voids 138.

Note that, in FIG. 3, voids 158 configuring an internal void array 150 are arrayed in a thickness direction of the glass plate 110 (Z-axis direction). That is, the internal void array 150 extends in the Z-axis direction. However, the above configuration is merely an example, and the voids configuring the internal void array 150 may be arrayed from the first main surface 112 to the second main surface 114 in a state where the voids are inclined relative to the Z-axis direction.

Moreover, in the example illustrated in FIG. 3, the internal void array 150 is configured of an array of three voids 158 except for the surface void 138. However, the above-described configuration is merely an example, and the internal void array 150 may be configured of one void, two voids, or four or more voids 158. Moreover, the number of voids 158 included in the internal void array 150 may be different. Furthermore, some voids 158 may be coupled to the surface void 138, to form a "long" surface void 138.

Furthermore, the internal void array 150 may have a void that opens on the second main surface 114 (second surface void), and may not have the second surface void.

Note that, as is clear from the aforementioned description, it is necessary to pay attention to the point that the in-plane void region 130 is not a region formed as an actual continuous "line", but indicates a virtual region having a linear shape formed when the surface voids 138 are connected.

Similarly, it is necessary to pay attention to the point that the internal void array 150 is not a region formed as an actual continuous "line", but indicates a virtual region having a linear shape formed when the voids 158 are connected.

Furthermore, one in-plane void region 130 is not necessarily required to be recognized as one "line" (array of the surface voids 138), but one in-plane void region 130 may be formed as an aggregate of a plurality of parallel "lines" that are arranged in a state of being close to each other.

Figure 4:
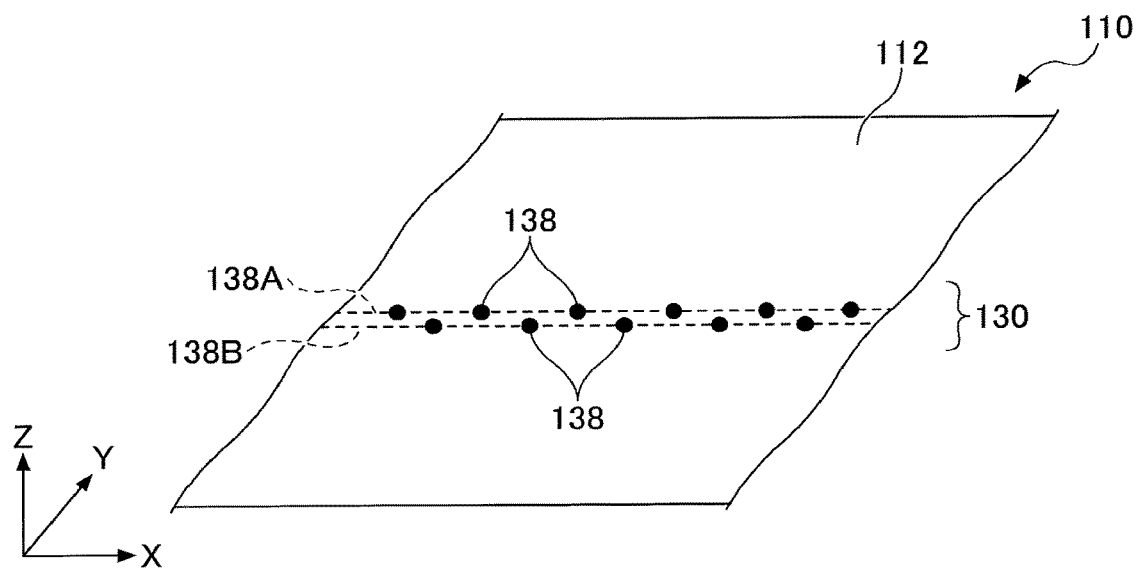
FIG. 4 is a diagram schematically depicting an example of a form of the in-plane void region.

FIG. 4 is a diagram depicting an example of the in-plane void region 130 that is recognized as such an aggregate of a plurality of "lines". In this example, on the first main surface 112 of the glass plate 110, two surface void arrays 138A and 138B parallel to each other are formed, and thereby one in-plane void region 130 is configured. A distance between the two surface void arrays 138A and 138B is, for example, 5 μm or less, and is preferably 3 μm or less.

Note that, in an example illustrated in FIG. 4, the in-plane void region 130 is configured of two surface void arrays 130A and 130B. However, the in-plane void region 130 may be configured of three or more surface void arrays.

In the following, the in-plane void region configured of a plurality of surface void arrays, in this way, will be particularly referred to as a "multi-line in-plane void region". Moreover, the in-plane void region 130 configured of one surface void array, as illustrated in FIG. 3, will be particularly referred to as a "single line in-plane void region", and will be distinguished from the "multi-line in-plane void region".

The in-plane void region 130 and the internal void array 150, as described above, can be formed by irradiating the first main surface 112 of the glass plate 110 with laser light of a first laser under a specified condition.

More specifically, by irradiating a first position in the first main surface 112 of the glass plate 110 with laser light of the first laser, a first internal void array including a first surface void is formed from the first main surface 112 to the second main surface 114. Then, the position in the glass plate of irradiation with laser light is changed to a second position, and by irradiating the second position of the first main surface 112 of the glass plate 110 with laser light of the first laser, a second internal void array including a second surface void is formed from the first main surface 112 to the second main surface 114. By repeating the operation, the in-plane void region 130 and the internal void array 150 corresponding to the in-plane void region 130 can be formed.

Note that, in the case where the internal void array having the void 158 sufficiently close to the second main surface 114 is not formed by one operation of irradiation with laser light, i.e. a void closest to the second main surface 114, among the voids 158, remains sufficiently far from the second main surface 114 (For example, a distance from the void closest to the second main surface 114 to the first main surface 112 is a half or less of the thickness of the glass plate 110) or the like, two or more operations of irradiation with laser light may be performed at substantially the same position of irradiation. Note that "substantially the same position (of irradiation)" includes, in addition to the case where two positions completely coincide with each other, the case where two positions are shifted slightly (e.g. 3 μm at a maximum) from each other.

For example, a "deeper" internal void array 150 may be formed as follows. That is, after forming the first in-plane void region 130 and the internal void array 150 corresponding to the first in-plane void region 130 by performing a plurality of operations of irradiation with laser light in a first direction parallel to the first main surface 112 of the glass plate 110 (first path), an operation of irradiation with laser light is performed almost in the same direction as in the first path and almost at the same position of irradiation as in the first path (second path). Thus, the "deeper" internal void array 150 corresponding to the first in-plane void region 130 is formed.

Although it depends on the thickness of the glass plate 110, a distance from a center of the void, located at the closest position to the second main surface 114 among the voids 158 configuring the internal void array 150, to the second main surface 114 preferably falls within a range from 0 μm to 10 μm.

The first laser that can be used in the aforementioned process includes, for example, a short pulsed laser with a pulse width of a femtosecond order to a nanosecond order, i.e. $1.0 \times 10^{-15}$ to $9.9 \times 10^{-9}$ seconds. Furthermore, laser light of the short pulsed laser is preferably a burst pulsed light so that internal voids are formed effectively. Moreover, an average output power of such a short pulsed laser within the irradiation period is, for example, 30 W or more. In the case where the average output power of the short pulsed laser is less than 10 W, satisfactory voids may not be formed. For example, a burst pulsed laser light, that forms one internal void array with 3 to 10 pulses, includes a laser light of a laser with an output power of about 90% of the rated power (50 W), with a burst frequency of about 60 kHz, and with a burst time width of 20 picoseconds to 165 nanoseconds. The burst time width preferably falls within a range from 10 nanoseconds to 100 nanoseconds.

Moreover, an irradiation method with laser light includes, a method using a self-focusing of a beam based on the Kerr-effect, a method using a Gaussian Bessel beam with an axicon lens, a method using a line focusing beam formed by an aberration lens, and the like. In any case, any method can be employed as long as an in-plane void region and an internal void array can be formed.

For example, in the case of using the burst laser apparatus, by changing the irradiation conditions with laser light of the first laser appropriately, a dimension of a void configuring the internal void array 150, a number of voids 158 included in the internal void array 150, and the like can be changed to a certain extent.

Note that in the following description, a plane including the in-plane void region 130, and the internal void array 150 corresponding to the in-plane void region 130 (a plane 165 indicated by hatching in FIG. 3) will be referred to as a "virtual end face". The virtual end face 165 substantially corresponds to an end face of the glass article manufactured by the first manufacturing method.

Figure 5:
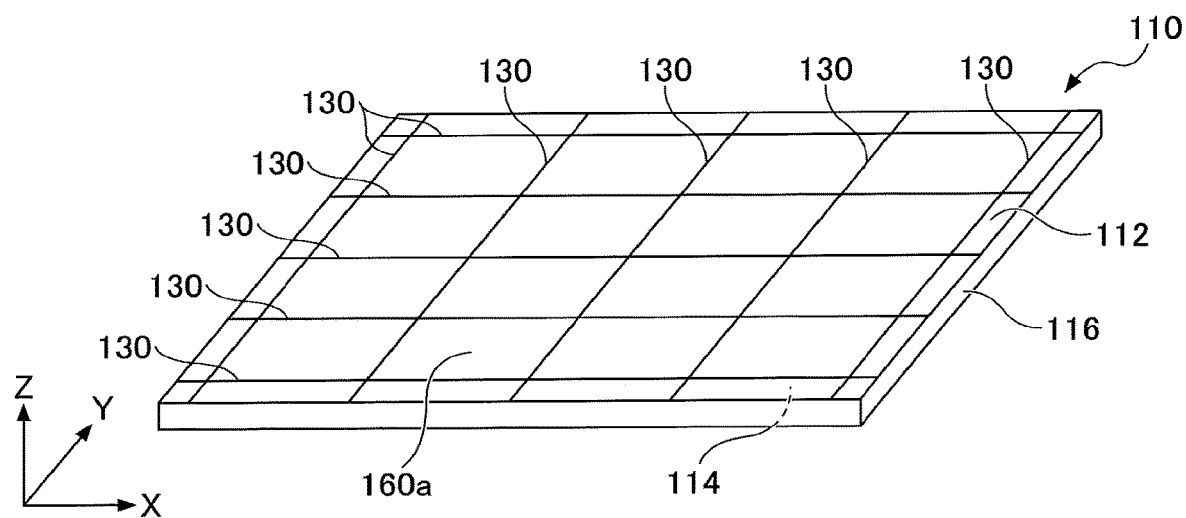
FIG. 5 is a diagram schematically depicting an example of a state where a plurality of in-plane void regions are formed on a first main surface of the glass plate.

FIG. 5 is a diagram schematically depicting an example of a state where a plurality of in-plane void regions 130 are formed on the first main surface 112 of the glass plate 110.

In the example illustrated in FIG. 5, on the first main surface 112 of the glass plate 110, five in-plane void regions 130 in the horizontal direction (X-axis direction) and five in-plane void regions 130 in the vertical direction (Y-axis direction) are formed. Moreover, although it is unviewable in FIG. 5, a plurality of internal void arrays, in which one void or two or more voids are intermittently arranged toward the second main surface 114, below the in-plane void region 130, i.e. on the second main surface 114 side, are formed.

In FIG. 5, a virtual portion defined by two in-plane void regions 130 arranged closely to each other in the vertical direction of the glass plate 110, two in-plane void regions 130 arranged closely to each other in the horizontal direction, and internal void arrays corresponding to the in-plane void regions, i.e. the smallest unit of a virtual portion surrounded by four virtual end faces, will be referred to as a glass piece.

A shape of the in-plane void region 130, and a shape of the glass piece 160a substantially correspond to a shape of a glass article obtained after the process of step S130. For example, in FIG. 5, from the glass plate 110, finally 16 glass articles each having a rectangular shape are manufactured. Moreover, as described above, a virtual end face 165, including in-plane void regions 130 and internal void arrays 150 corresponding to the in-plane void regions, corresponds to one end face of a glass article manufactured after the process of step S130.

Note that the shape and the arrangement form of the glass piece 160a, illustrated in FIG. 5, are merely examples. The glass piece 160a can be formed in a predetermined shape and in a predetermined arrangement, according to a shape of a final product of the glass article.

Figure 6:
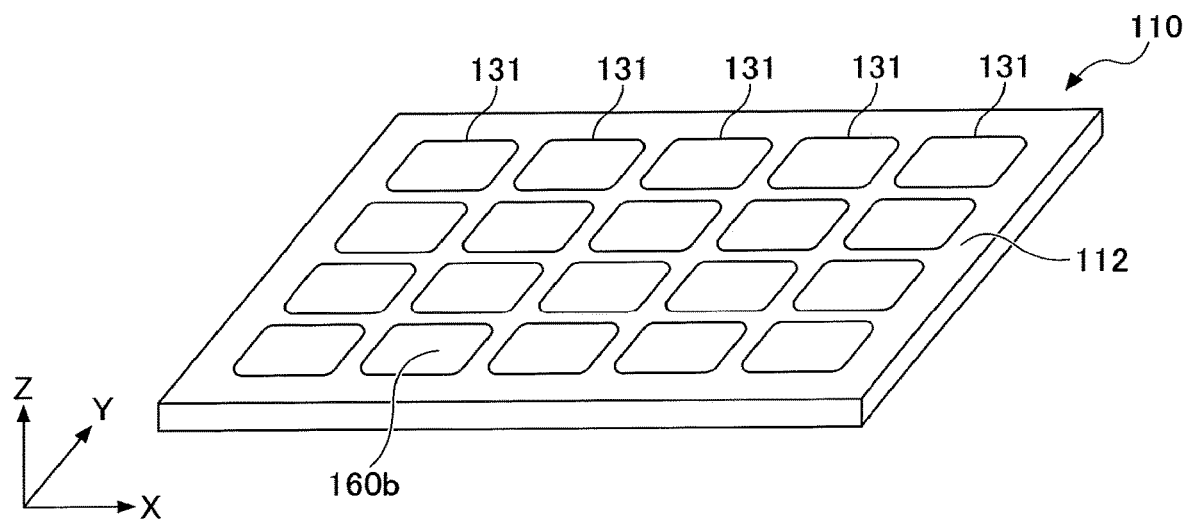
FIG. 6 is a diagram schematically depicting an example of the in-plane void region.
Figure 7:
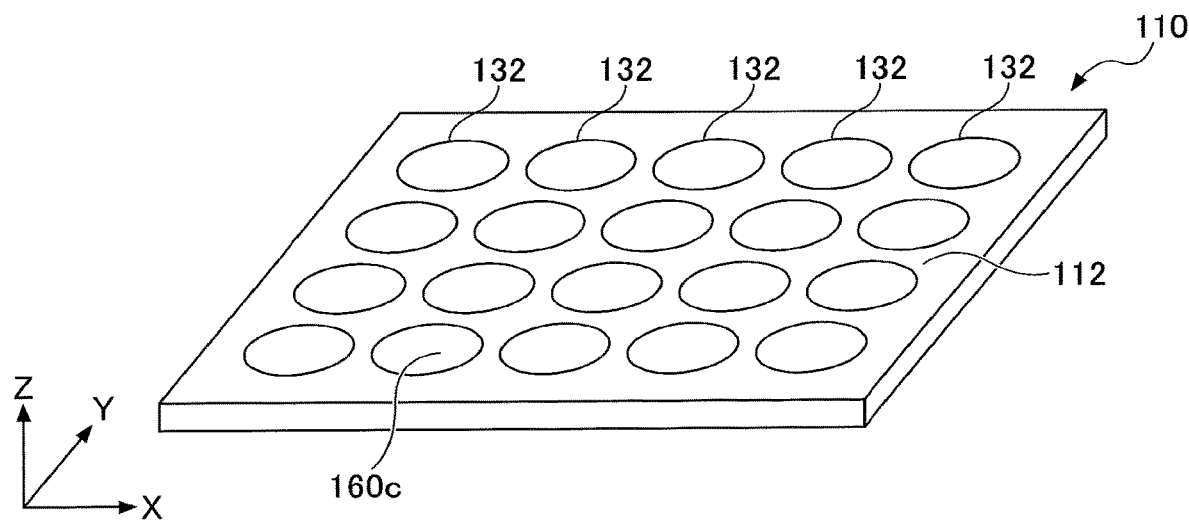
FIG. 7 is a diagram schematically depicting another example of the in-plane void region.

FIG. 6 and FIG. 7 are diagrams schematically depicting examples of another mode of a possible in-plane void region and furthermore a glass piece.

In the example illustrated in FIG. 6, each in-plane void region 131 is arranged as a closed line (loop) having an approximately rectangular shape, and curved portions at corners. Thus, a glass piece 160b surrounded by the in-plane void region 131 and internal void arrays (invisible) has a form of an approximately rectangular plate shape with curved portions at corners.

Moreover, in the example illustrated in FIG. 7, each in-plane void region 132 is arranged as a closed line (loop) having an approximately elliptical shape. Thus, a glass piece 160c has an approximately disk-shaped form.

Moreover, in the aforementioned examples, a continuous end face of the glass article is formed by one virtual end face. Thus, each of the obtained glass articles has only one end face.

In this way, each of the in-plane void regions 130, 131 and 132 may be formed of a straight line, a curved line or a combination thereof. Moreover, each of the glass pieces 160a, 160b, and 160c may be surrounded by a single virtual end face, or a plurality of virtual end faces.

(Chemical strengthening process) In the case where the glass plate 110 includes an alkali metal, after step S110 and before step S120, a chemical strengthening process may be performed for the glass plate 110.

The chemical strengthening process is a process in which a glass plate is immersed in a molten salt including alkali metals, to replace alkali metal ions existing on a surface of the glass plate 110 having smaller atomic radii by alkali metal ions existing in the molten salt having greater atomic radii.

The conditions for the chemical strengthening process are not particularly limited. For example, the chemical strengthening process may be performed by immersing the glass plate 110 in a molten salt at a temperature of 430 C to 500 C for a period that falls within a range from 1 minute to 2 hours.

For the molten salt, a nitrate salt may be used. For example, in the case of replacing lithium ions contained in the glass plate 110 by alkali metal ions having greater sizes, a molten salt including at least one of sodium nitrate, potassium nitrate, rubidium nitrate and cesium nitrate may be used. Moreover, in the case of replacing sodium ions contained in the glass plate 110 by alkali metal ions having greater sizes, a molten salt including at least one of potassium nitrate, rubidium nitrate and cesium nitrate may be used. Furthermore, in the case of replacing potassium ions contained in the glass plate 110 by alkali metal ions having greater sizes, a molten salt including at least one of rubidium nitrate and cesium nitrate may be used.

By performing the chemical strengthening process for the glass plate 110, a compression stress layer can be formed on the first main surface 112 and the second main surface 114, and thereby strength of the first main surface 112 and of the second main surface 114 can be enhanced. A thickness of the compression stress layer corresponds to a penetration depth of the alkali metal ions for replacing. For example, in the case of replacing sodium ions by potassium ion by using potassium nitrate, for a soda lime glass a compression stress layer with a thickness that falls within a range of 8 μm to 27 μm can be formed, and for an alumino-silicate glass a compression stress layer with a thickness that falls within a range from 10 μm to 100 μm can be formed. In the case of the alumino-silicate glass, a depth that alkali metal ions penetrate is preferably 10 μm or more, and more preferably 20 μm or more.

In the glass plate 110 before performing the chemical strengthening process, by the aforementioned laser irradiation process (step S110), the aforementioned in-plane void regions 130, 131, and 132, and the internal void arrays 150 are formed. Thus, when the chemical strengthening process is performed, the molten salt is introduced into an inside of the glass plate 110 via the surface voids 138 and voids 158.

As a result, according to the chemical strengthening process, in addition to the exposed surface of the glass plate 110 (i.e. the first main surface 112, the second main surface 114, and end face 116), the strength of the virtual end face can be enhanced.

Figure 8:
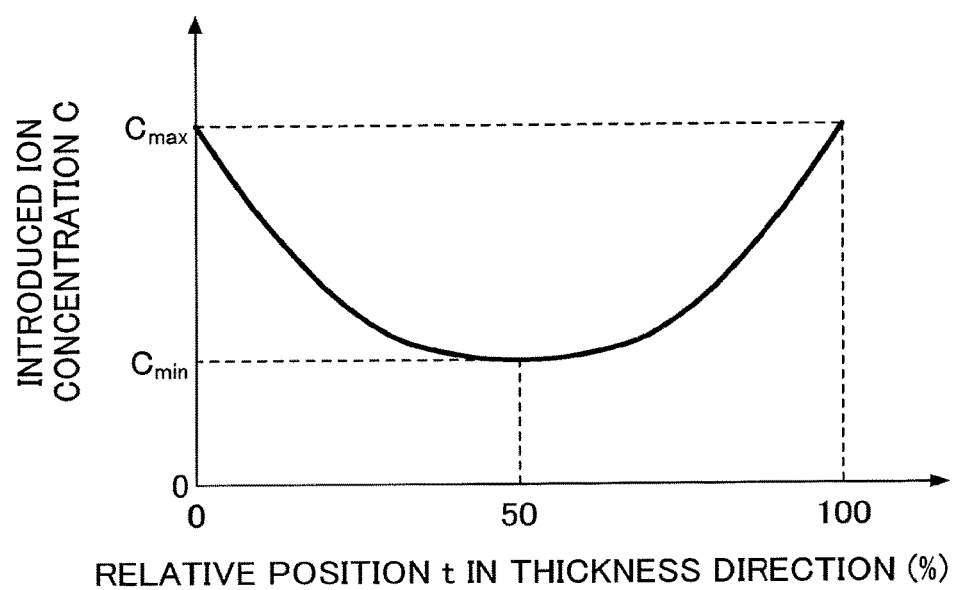
FIG. 8 is a diagram schematically depicting a profile of an introduced ion concentration in an in-plane direction of a virtual end face (corresponding to a thickness direction of the glass plate) according to the embodiment of the present invention.

FIG. 8 is a diagram schematically depicting a profile of an introduced ion concentration in an "in-plane direction" of the virtual end face (the thickness direction of the glass plate 110. See Z-axis direction indicated in FIG. 3).

The "introduced ion" means alkali metal ions introduced into the glass plate 110 by the chemical strengthening process, i.e. alkali metal ions for adding compression stress layers on the first main surface 112 and the second main surface 114 of the glass plate 110, to enhance the strength of the main surfaces.

In FIG. 8, the horizontal axis indicates a relative position t (%) in the thickness direction of the glass plate 110. The first main surface 112 corresponds to t=0%, and the second main surface 114 corresponds to t=100%. The vertical axis indicates a concentration C of the introduced ion. Note that the concentration C was calculated by subtracting a concentration of alkali metal ions of the same type as the introduced ions that are contained in a part other than the first main surface 112, the second main surface 114 and the end face 116 of the glass plate 110, i.e. that are contained in a bulk portion of the glass plate 110.

As illustrated in FIG. 8, in the virtual end face, the concentration C of the introduced ion in the thickness direction of the glass plate 110, over the entire virtual end face, has a profile greater than the concentration in the bulk portion (bulk concentration). In the example, the concentration C shows a profile having an approximately parabolic shape. That is, the concentration C of the introduced ions tends to have maximum values $C_{max}$ at the first main surface 112 (t=0%) and at the second main surface 114 (t=100%), and have minimum $C_{min}$ at a central portion in the depth direction (t=50%). Note that the minimum value $C_{min}$ is positive.

Note that the shape of the concentration profile of the introduced ions varies depending on the thickness and the material of the glass plate 110, the conditions of the chemical strengthening process, and the like. However, in any case, the concentration over the entire virtual end face is greater than the concentration contained in the bulk portion, and as an example, the profile having an approximately parabolic shape, as described above, is generated. However, due to a difference in the conditions of the chemical strengthening process, the concentration C of the introduced ions at the first main surface 112 (t=0%) often does not coincide precisely with the concentration C of the introduced ions at the second main surface 114 (t=100%). That is, the concentration C often has a maximum $C_{max}$ at only either of the main surfaces. Moreover, the profile having the approximately parabolic shape is, different from a mathematical definition of a parabola, a profile in which the introduced ion concentration C increases on the first main surface side and on the second main surface side with respect to the central portion in the thickness direction, and the introduced ion concentration in the concentration profile is greater than the bulk concentration of the glass article. Thus, in the profile having the approximately parabolic shape, a profile in which the introduced ion concentration is greater than the bulk concentration of the glass article, and the introduced ion concentration C varies relatively slowly at the central portion in the thickness direction, i.e. having an approximately trapezoidal shape, is included.

In this way, in the first manufacturing method, the virtual end face also can be subjected to the chemical strengthening process.

Note that, the chemical strengthening process is performed in case of necessity, and may be omitted. Moreover, the chemical strengthening process may be performed before the aforementioned laser irradiation process (step S110). However, in this case, it is necessary to pay attention to the point that the region strengthened by the chemical strengthening process is limited to an exposed surface (the first main surface 112, the second main surface 114 and the end face 116), and the virtual end face is not strengthened.

(Step S120)

Next, an organic film is deposited on the first main surface 112 or the second main surface 114 of the glass plate 110. In the following, as an example, the case where an organic film is deposited on the first main surface 112 of the glass plate 110 will be described.

Figure 9:
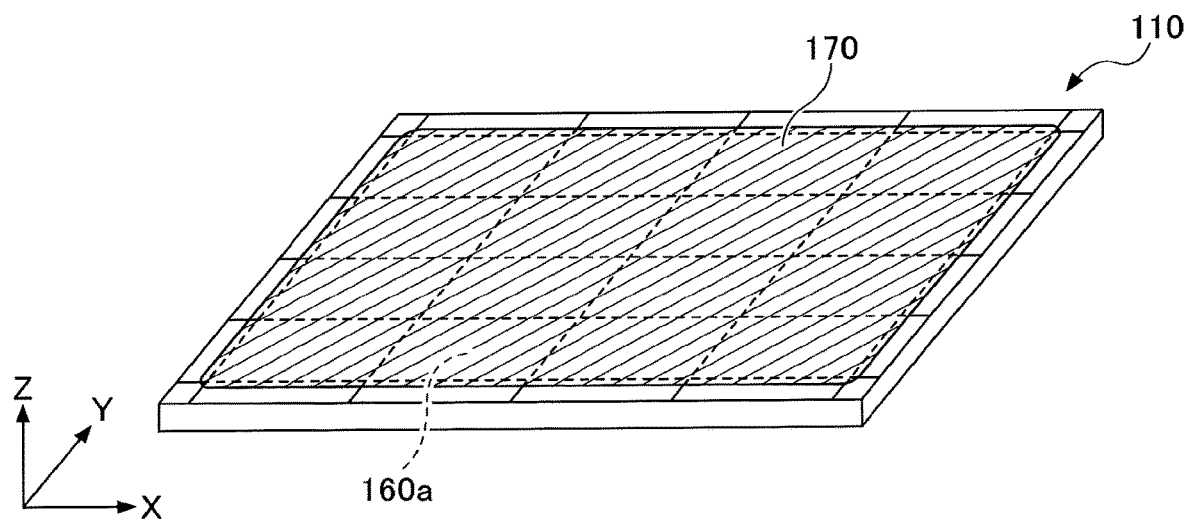
FIG. 9 is a diagram schematically depicting an example of a state where an organic film is formed on the first main surface of the glass plate.
Figure 10:
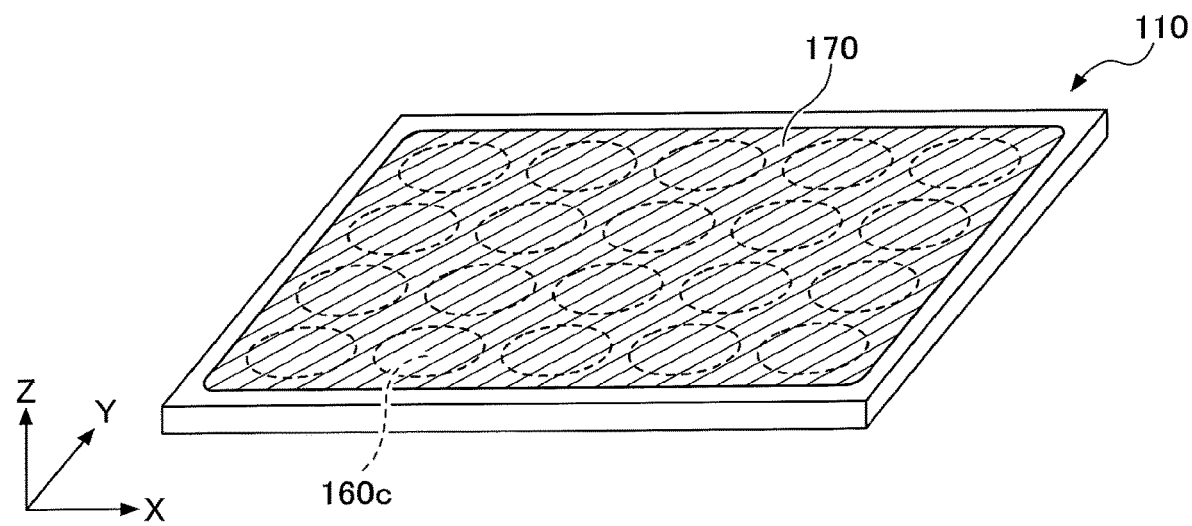
FIG. 10 is a diagram schematically depicting another example of the state where the organic film is formed on the first main surface of the glass plate.
Figure 11:
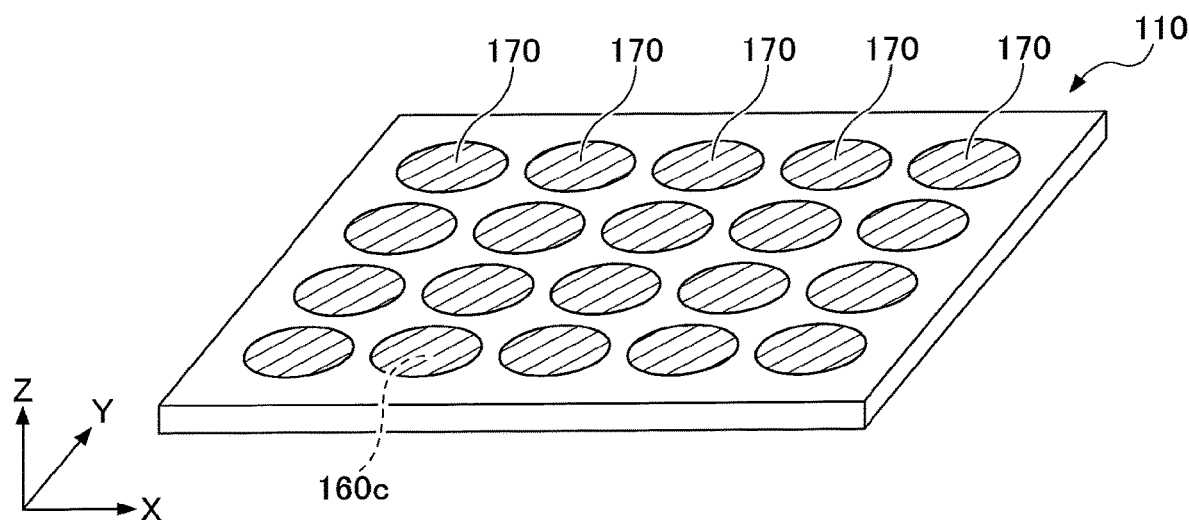
FIG. 11 is a diagram schematically depicting yet another example of the state where the organic film is formed on the first main surface of the glass plate.

FIGS. 9 to 11 are diagrams schematically depicting examples of a state where an organic film 170 is formed on the first main surface 112 of the glass plate 110.

The organic film 170 is arranged so as to cover at least a surface region of each glass piece (surface corresponding to the first main surface 112 of the glass plate 110).

For example, in the example, illustrated in FIG. 9, the organic film 170 is arranged so that the surface regions of the glass pieces 160a are covered, and on the first main surface 112, only a peripheral portion is exposed in a frame shape.

Moreover, in FIG. 10, the organic film 170 is arranged so that the surface regions of the glass pieces 160c are covered, and only a peripheral portion is exposed in a frame shape. Note that the configuration illustrated in FIG. 10 is different from the configuration illustrated in FIG. 9 in that, on the first main surface 112 of the glass plate 110, the organic film 170 is also arranged in a region other than the glass piece 160c.

Furthermore, in FIG. 11, the organic film 170 is arranged in a plurality of regions so as to cover only the surface regions of the glass pieces 160c.

Note that the arrangement forms of the organic film 170 shown in FIGS. 9 to 11 are merely examples, and the organic film 170 may be arranged in any form as long as the organic film 170 covers the surface regions of the glass pieces 160a to 160c. Particularly, the organic film 170 is preferably deposited over the entire first main surface 112. In this case, a masking process becomes unnecessary.

The organic film 170 may be configured of a polymer having a siloxane linkage as a main skeleton and containing fluorine (F), for example.

The following formula (1) shows an example of a chemical formula of a material configuring the organic film 170.

[Chemical 1]

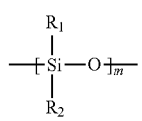

Formula (1)

where reactive groups $R_1$ and $R_2$ are selected independently from a group including fluorine (F), oxygen (O), carbon (C), and an alkenyl group ($C_nH_{2n-1}$ where n is an integer that falls within a range of 2 to 100).

When an organic film having such reaction groups is used, a water repellency can be exhibited on the first main surface 112 of the glass plate 110.

A thickness of the organic film 170 is not particularly limited, but may, for example, fall within a range of 1 nm to 1 μm. In the case of the fluorine-based organic film, the thickness preferably falls within a range of 1 nm to 10 nm.

A manufacturing method of the organic film 170 is not particularly limited. The organic film 170 may be deposited using a conventional deposition technique such as a sputtering method, an evaporation method, and a coating method.

Note that before depositing the organic film 170, another function film or two or more function films may be formed on the first main surface 112 of the glass plate 110. For example, on the first main surface 112 of the glass plate 110, an antireflection film may be deposited. The antireflection film is typically configured by alternately laminating a plurality of oxide layers having different refractive indices. Alternatively, a function film other than the antireflection film may be arranged.

(Step S130)

Next, a glass article is separated from the glass plate 110.

In the separation process, a laser light of a laser different from the first laser at step S110 (in the following, referred to as a "second laser") is used. Note that in the aforementioned deposition process (step S120) the main surface of the glass plate 110, on which the organic film 170 is deposited (in the following, referred to as a "deposition surface"), is irradiated with laser light of the second laser. Note that a surface irradiated with the laser light of the second laser may or may not be a surface that is the deposition surface. For example, in the case where a black film or the like is formed on the surface that is not the deposition surface, the deposition surface is preferably irradiated with laser light of the second laser.

The second laser includes, for example, a solid state laser, a gas laser, a semiconductor laser, or a free electron laser. The solid state laser includes, for example, a YAG laser. The gas laser includes, for example, a $CO_2$ laser, excimer laser, argon (Ar) laser, or helium (He)-neon (Ne) laser.

In the aforementioned process (step S110), the virtual end face 165 formed in the glass plate 110 has, within the end face, the plurality of surface voids 138 and the voids 158, included in the in-plane void region 130 and the corresponding internal void arrays 150. Thus, in the separation process, the surface voids 138 and the voids 158 play a role of a "perforation".

That is, when the in-plane void region 130 (or neighborhood thereof, and the same applied to the following) is irradiated with laser light of the second laser, according to heat from the laser light of the second laser, the voids 158 configuring the internal void array 150 near the irradiation position are connected to each other, and a cutting line that perforates the glass plate 110 in the depth direction is formed. Thus, when such laser light of the second laser is made to scan along the in-plane void region 130, in the internal void array 150, the voids 158 are connected to each other, and the internal void array 150 changes to a cutting line. Furthermore, the surface voids 138 configuring the in-plane void region 130 are connected to each other, and a cutting line appears within the first main surface 112.

As a result, the glass plate 110 is divided at the aforementioned virtual end face 165, and thereby a glass article is separated from the glass plate 110 or two or more glass articles are separated from the glass plate 110.

As described above, in the first manufacturing method, through step S110 to step S130, a glass article or two or more glass articles can be manufactured from the glass plate 110.

In the case of performing a fusion cutting for a glass plate, by irradiating the glass plate with laser light of the second laser using the method described in Japanese Translation of PCT international application publication No. 2012-526721, a glass article can be separated from the glass plate, but at this time the organic film 170 may be damaged.

In the first manufacturing method according to the embodiment, before the separation process by the second laser, the in-plane void region 130 and the internal void arrays 150 were already formed in the glass plate 110, in step S110. Thus, in the first manufacturing method, without irradiating with laser light of the second laser with great energy required for the fusion cutting for the glass plate 110, a glass article can be separated relatively easily.

Specifically, in the first manufacturing method, laser light of the second laser used in step S130 is emitted to the deposition surface under the following irradiation condition:

when, in the organic film of the separated glass article, a central portion within the surface is MC, and a point in an end face of the glass article in a top view is MP (however, in a case where the glass article has an approximately polygonal shape, MP is selected from points other than intersection parts of two sides), at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and at the central portion MC, a count number for fluorine and a count number for silicon obtained by an X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$, a ratio of $R_{MP}$ to $R_{MC}$ is 0.3 or more.

Note that the irradiation energy is not necessarily uniform within a spot diameter. For example, within the spot diameter, the energy at the central portion may be lower than the energy at the peripheral portion, and vice versa. Thus, for the end face with respect to the point MP, not only the end face but also a range of the spot diameter of laser light of the second laser on the organic film near the end face is included, and the count number $I_{MP}(F)$ indicates a minimum value within the end face and the range of the spot diameter. The same applies to MP and $I_{MP}(F)$ described as follows.

In the case of irradiating the glass plate 110 with laser light of the second laser under such an irradiation condition, an effect on the organic film 170 can be controlled significantly.

As a result, in the first manufacturing method, by irradiating the deposition surface of the glass plate 110 with laser light of the second laser, and scanning along the in-plane void region 130 with the laser light of the second laser, a glass article can be separated from the glass plate 110 without causing a remarkable effect on the organic film 170.

The aforementioned irradiation conditions can be obtained by adjusting a type of laser, an output power of laser irradiation, a speed of scanning, the spot diameter, and the like. For example, in the case where the second laser is a YAG laser, because an absorption ratio of laser energy for a glass is smaller than that of a $CO_2$ laser, the second laser requires more energy.

(Another Manufacturing Method of a Glass Article According to the Embodiment of the Present Invention)

Next, with reference to FIG. 12, another manufacturing method of a glass article according to the embodiment of the present invention will be described.

Figure 12:
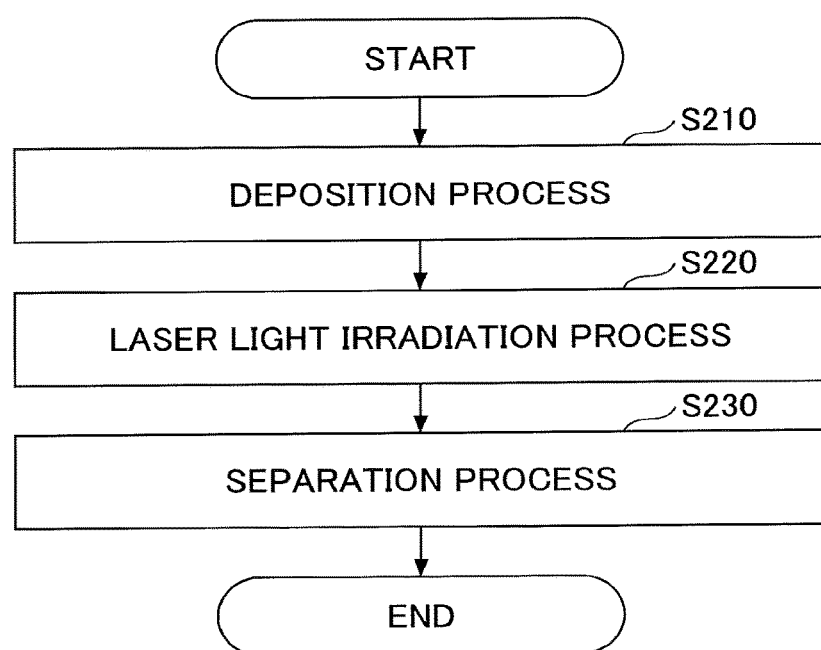
FIG. 12 is a flowchart schematically depicting another example of the flow of the manufacturing method of the glass article according to the embodiment of the present invention.

FIG. 12 is a flowchart schematically depicting an example of a flow of another manufacturing method of the glass article according to the embodiment of the present invention (in the following, will be referred to as a "second manufacturing method").

As illustrated in FIG. 12, the second manufacturing method includes:

a deposition step (1) of, in a glass plate having a first main surface and a second main surface, opposite each other, depositing an organic film on the first main surface of the glass plate (step S210);

a laser irradiation step (2) of irradiating the first main surface of the glass plate with a laser light of a first laser (step S220); and a separation step (3) of scanning the first main surface of the glass plate with a laser light of a second laser that is different from the first laser, to separate one glass article or two or more glass articles from the glass plate (step S230).

In the following, the processes will be described. Note that in order to make clear the explanation, also in the following description, when a member or a part is indicated, the reference numeral in FIGS. 2 to 11, used for the explanation for the aforementioned first manufacturing method will be used.

(Step S210)

First, a glass plate 110 having a first main surface 112 and a second main surface 114, opposite each other, is provided.

The glass plate 110 may also have the form as illustrated in FIG. 2.

Next, a chemical strengthening process may be performed for the glass plate 110 in case of necessity. However, in the second manufacturing method, it is necessary to pay attention to the point that the region strengthened by the chemical strengthening process is limited to an exposed surface (the first main surface 112, the second main surface 114 and the end face 116), and the virtual end face, obtained in a process (step S220), which will be described later, is not strengthened.

Next, the organic film 170 is deposited on the first main surface 112 of the glass plate 110.

Note that the specification, the method of deposition, and the location of deposition of the organic film 170 were described in the aforementioned first manufacturing method. Thus, detailed descriptions will be omitted.

As described above, the organic film 170 is preferably deposited over the entire first main surface 112 of the glass plate 110. In the following, the main surface of the glass plate 110, on which the organic film is deposited, will also be referred to as a "deposition surface".

(Step S220)

Next, the deposition surface of the glass plate 110 is irradiated with laser light of a first laser. It is necessary to pay attention to the point that the first laser used in this process is different from a second laser used in a separation process (step S230), which will be described later.

According to the irradiation with laser light of the first laser, on the deposition surface of the glass plate 110, i.e. the first main surface 112, an in-plane void region 130 is formed. Moreover, below the in-plane void region, i.e. toward the second main surface 114, a plurality of internal void arrays 150 are formed.

As described above, a plane including the in-plane void region 130 and the internal void array 150 corresponding to the in-plane void region 130 will be referred to as a "virtual end face" 165. The virtual end face 165 substantially corresponds to an end face of the glass article manufactured by the second manufacturing method.

(Step S230)

Next, a separation process for separating a glass article from the glass plate 110 is performed.

In the separation process, a laser different from the first laser at step S220 (in the following, referred to as a "second laser") is used. Note that the deposition surface of the glass plate 110 is irradiated with laser light of the second laser.

As described above, according to the irradiation and scanning of laser light of the second laser, the glass plate 110 is divided at the aforementioned virtual end face 165, and thereby a glass article or two or more glass articles are separated from the glass plate 110.

Also in the second manufacturing method, before the separation process by the second laser, the in-plane void region 130 and the internal void arrays 150 were already formed in the glass plate 110, in step S220. Thus, in the second manufacturing method, without irradiating the glass plate 110 with laser light of the second laser with great energy required as in fusion cutting, a glass article can be separated relatively easily.

Specifically, in the second manufacturing method, laser light of the second laser used in step S230 is emitted to the deposition surface under the following irradiation condition:

when, in the organic film of the separated glass article, a central portion within the surface is MC, and a point in an end face of the glass article in a top view is MP (however, in a case where the glass article has an approximately polygonal shape, MP is selected from points other than intersection parts of two sides), at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and at the central portion MC, a count number for fluorine and a count number for silicon obtained by an X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$, a ratio of $R_{MP}$ to $R_{MC}$ is 0.3 or more.

In the case of irradiating the glass plate 110 with laser light of the second laser under such an irradiation condition, an effect on the organic film 170 can be controlled significantly.

As a result, in the second manufacturing method, by irradiating the deposition surface of the glass plate 110 with laser light of the second laser, and scanning along the in-plane void region 130 with the laser light of the second laser, a glass article can be separated from the glass plate 110 without causing a remarkable effect on the organic film 170.

Moreover, when a glass article is separated from the glass plate 110, the glass plate 110 is preferably irradiated with the laser light of the second laser satisfying the following irradiation condition:

When a value of a contact angle of the organic film with respect to a drop of water at the point MP is $T_{MP}$, and a value of a contact angle of the organic film with respect to a drop of water at the central portion MC is $T_{MC}$, a ratio of $T_{MP}$ to $T_{MC}$ is 0.90 or more.

In the case of irradiating the glass plate 110 with laser light of the second laser under such an irradiation condition, the glass article can be separated without damaging a water repellency of the organic film 170.

As described above, using the first and second manufacturing methods as examples, the manufacturing method of the glass article according to the embodiment of the present invention has been described. However, the aforementioned manufacturing methods are merely examples, and yet another manufacturing method may be applied in the present invention. For example, in the first and second manufacturing methods, a part of the processes may be modified or changed and/or another process may be added to the first and second manufacturing methods.

Note that, in the first and second manufacturing methods, because a plurality of in-plane voids are formed in the glass plate, when a glass article is separated from the glass plate, a great energy as in the conventional case is not required. Thus, the glass article can be separated by simply applying hot air to the glass plate without using a laser. However, in this case, it is more difficult to control the hot air in order to separate the glass article having a specified shape, than the case of using a laser. This is because when hot air is applied, a temperature distribution in the glass plate by the hot air is broader than the case of using a laser.

(Glass Article According to the Embodiment of the Present Invention)

Next, with reference to FIG. 13 and FIG. 14, a glass article according to the embodiment of the present invention will be described.

Figure 13:
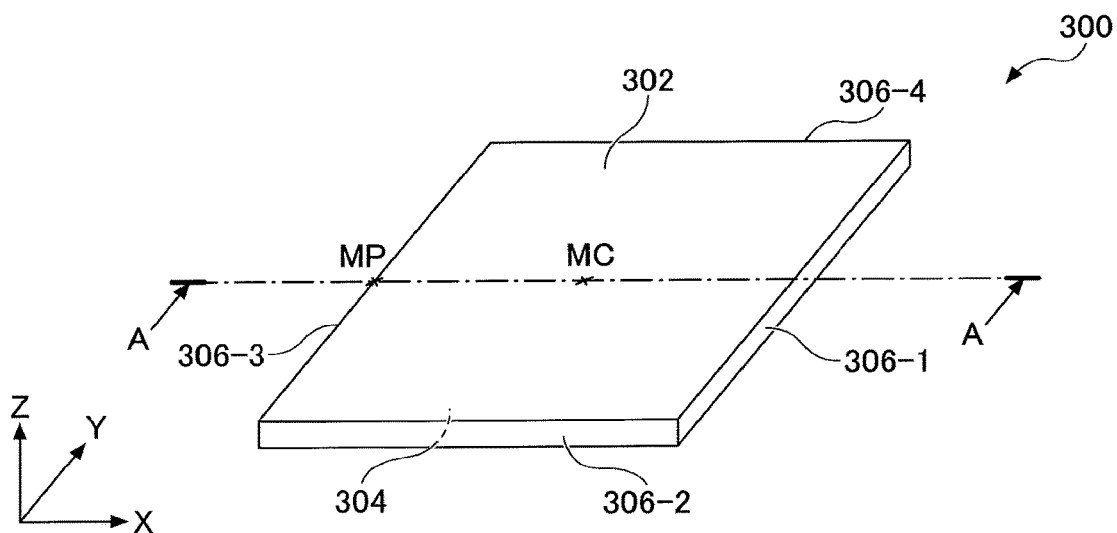
FIG. 13 is a perspective view schematically depicting an example of the glass article according to the embodiment of the present invention.

FIG. 13 is a perspective view schematically depicting the glass article according to the embodiment of the present invention (in the following, referred to as a "first glass article"). Moreover, FIG. 14 is a cross sectional view schematically depicting the first glass article cut along a line A-A in FIG. 13.

Figure 14:
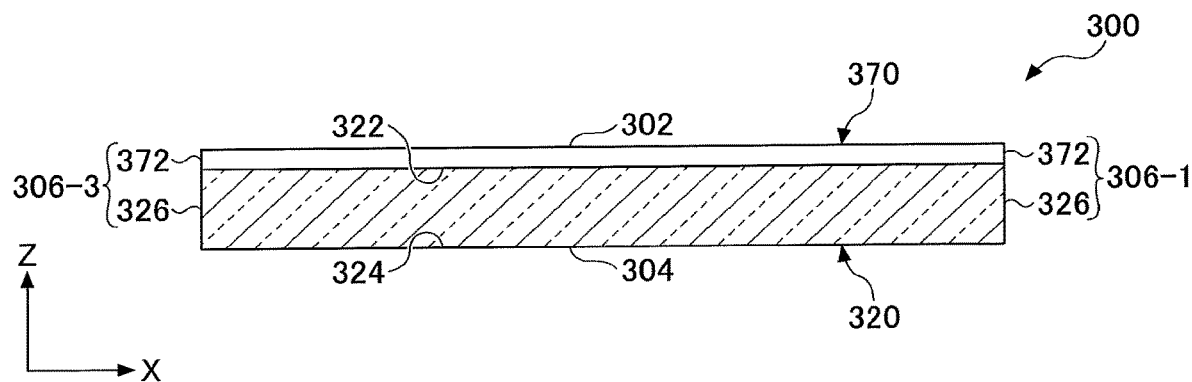
FIG. 14 is a cross-sectional view schematically depicting the glass article cut along a line A-A in FIG. 13.

As illustrated in FIG. 13 and FIG. 14, the first glass article 300 includes a first main surface 302 and a second main surface 304, opposite each other, and an end face connecting the first main surface 302 and the second main surface 304.

In the example illustrated in FIG. 13, the first glass article 300 has an approximately rectangular shape, and four end faces 306-1 to 306-4. Moreover, the end faces 306-1 to 306-4 extend parallel to a thickness direction of the first glass article 300 (Z-axis direction).

As clearly illustrated in FIG. 14, the first glass article 300 includes a glass substrate 320 and an organic film 370. The glass substrate 320 has a first main surface 322 and a second main surface 324, opposite each other, and an end face 326 connecting the first main surface 322 and the second main surface 324. The organic film 370 is arranged on the first main surface 322 side of the glass substrate 320.

The first main surface 302 of the first glass article 300 corresponds to a surface of the organic film 370, and the second main surface 304 of the first glass article 300 corresponds to the second main surface 324 of the glass substrate 320. Moreover, each of the four end faces 306-1 to 306-4 of the first glass article 300 is configured of an end face 326 of the glass substrate 320, and an end face 372 of the organic film 370 corresponding to the end face 326.

Note that in the example, illustrated in FIG. 13 and FIG. 14, the first glass article 300 has an approximately rectangular shape.

However, the above-described configuration is merely an example, and as the shape of the first glass article 300, various forms are possible. For example, the shape of the first glass article 300 may be, in addition to a rectangular shape, a triangular shape, a polygonal shape of a pentagonal shape or others, a circular shape, an elliptical shape or the like. Moreover, in the case of the polygonal shape, corners may be subjected to a rounding process.

Moreover, a number of end faces of the first glass article 300 may be, for example, one, three, or four or more, depending on the form of the first main surface 302 and the second main surface 304. Furthermore, the end face of the first glass article 300 may extend inclined from the Z-axis direction (i.e. in a non-parallel direction to the Z-axis direction). In this case, an "inclined" end face is obtained.

A thickness of the first glass article 300 is not particularly limited. The thickness of the first glass article 300 may fall within a range of, for example, 0.03 mm to 6 mm.

The first glass article 300 has a feature that the organic film 370 properly exists also at positions of the end faces 306-1 to 306-4 of the first glass article 300 in the top view. That is, the thickness of the organic film 370 at the positions of the end faces 306-1 to 306-4 in the top view is thinner than the thickness at the central portion of the first glass article 300, but is not zero.

The aforementioned feature is a significant feature that cannot be obtained by the conventional manufacturing method, such as separating a glass article by fusion cutting for a glass plate using a high energy laser. This is because in the glass article manufactured by using the conventional method, the organic film is damaged by a heat from the laser, and seldom remains at a separation surface, i.e. the end face.

In the first glass article 300 according to the embodiment of the present invention, for example, by manufacturing the first glass article 300 using the aforementioned first manufacturing method or the second manufacturing method, the above-described feature can be obtained.

Particularly, in the organic film 170, an approximately central portion in a top view is MC (See FIG. 13), and a point on the end faces 306-1 to 306-4 of the first glass article 300 is MP (See FIG. 13. However, in a case where the first glass article 300 has an approximately polygonal shape, MP is selected from points other than intersection parts of two sides), at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and at the central portion MC, a count number for fluorine and a count number for silicon obtained by an X-ray photoelectron spectroscopy (XPS) are $I_{MC}(F)$ and $I_{MC}(n)$, respectively, and $R_{MC}$ is a ratio of the count number $I_{MC}(F)$ to the count number $I_{MC}(Si)$, a ratio of $R_{MP}$ to $R_{MC}$ is 0.3 or more.

Note that the ratio of $R_{MP}$ to $R_{MC}$ is less than 1.

In this way, in the first glass article 300, there is little damage to the organic film 370 at the cutting portion, and the organic film 370 can be arranged over the entire first main surface 302 of the first glass article 300.

(Other Features)

(Organic Film 370)

The configuration, the chemical formula, the thickness of the film, and the like of the organic film 370 are the same as for the aforementioned organic film 170. In the case of using the organic film 370, a water repellency can be caused to be achieved on the first main surface 302 of the first glass article 300.

Particularly, so as not to damage the water repellency, the glass plate is preferably radiated with laser light of the second laser satisfying the irradiating condition:

When a value of a contact angle of the organic film with respect to a drop of water at the point MP is $T_{MP}$, and a value of a contact angle of the organic film with respect to a drop of water at the portion MC is $T_{MC}$, a ratio of $T_{MP}$ to $T_{MC}$ is 0.90 or more.

(Chemical Strengthening)

In the first glass article 300, the glass substrate 320 may be subjected to the chemical strengthening process. In this case, in addition to the first main surface 322 and the second main surface 324, the chemical strengthening process may be performed for the end face 326.

However, in this case, a state of chemical strengthening, i.e. a distribution state of introduced ions (alkali metal ions introduced by the chemical strengthening process) of the first and second main surfaces 322 and 324 of the glass substrate 320 is different from the state of chemical strengthening of the end face 326.

For example, in the glass substrate 320, the end face 326 may have a concentration profile for the introduced ions having an approximately parabolic shape from the first main surface 322 toward the second main surface 324, as illustrated in FIG. 8.

Such a concentration profile of the introduced ions can be obtained, in the case where in the aforementioned first manufacturing method, the chemical strengthening process is performed between step S110 and step S120, to manufacture the first glass article 300.

In the case where the chemical strengthening process is performed in the stage of a large-sized glass plate, as described above, the first main surface 322 and the second main surface 324 of the glass substrate 320 are strengthened. However, the end face 326 is not strengthened.

As described above, with reference to FIG. 13 and FIG. 14, an example of the configuration of the first glass article 300 has been described.

The first glass article 300 can be applied to, for example, an electronic device (e.g. an information terminal device such as a smartphone, or a display device), a cover glass of a camera or a sensor, a glass for a building, a glass for an industry transport vehicle, a biomedical glass device, and the like.

For example, in the case where the first glass article 300 is a cover glass, the organic film 370 may be a fingerprint adhesion prevention film (AFP). Moreover, in this case, an additional film such as an antireflection film may be included between the glass substrate 320 and the organic film 370. The antireflection film may have a repeat structure of a plurality of oxide layers.

EXAMPLES

In the following, practical examples of the present invention will be described.

Practical Example 1

In the following description, Examples 1 to 5 illustrate practical examples, and Examples 11 and 12 illustrate comparative examples.

Example 1

In order to prepare a sample for evaluation, step S120 and step S130 in the first manufacturing method were performed.

Note that step S110 was not performed. This is because in the case where all steps S110 to S130 are performed to separate a glass article from a glass plate, subsequent evaluations for an organic film (water repellency evaluation and an XPS analysis) are required to be performed at a tip portion of an end face of the glass article, which makes an analysis operation complicated. In a glass plate for which only steps S120 and S130 are performed, because a glass article has not been separated yet, a region of the organic film which was irradiated with laser light of the second laser is required to be evaluated in step S130, and the evaluation of the organic film can be performed more easily. Note that it is clear that a result obtained by such evaluation is substantially the same as a result obtained at an end portion of the glass article separated by using the first manufacturing method.

First, for a glass plate, a base plate of an aluminosilicate glass, Dragontrail (trademark registered), before the chemical strengthening process was prepared. Dimensions of the glass plate were 100 mm (vertical)×100 mm (horizontal)× 0.8 mm (thickness).

Next, an antireflection film and an organic film were deposited on the whole of one of main surfaces of the glass plate (first main surface) in this order.

The antireflection film had a four layer structure of $Nb_2O_5$ (target thickness was 15 nm)/$SiO_2$ (target thickness was 35 nm)/$Nb_2O_5$ (target thickness was 120 nm)/$SiO_2$ (target thickness was 80 nm), and was deposited by using a sputtering method.

The organic film was a fingerprint adhesion prevention film (KY185 by Shin-Etsu Chemical Co., Ltd.), and was deposited by using an evaporation method. A target thickness of the organic film was 4 nm.

Next, the first main surface of the glass plate was irradiated with laser light of $CO_2$ laser. The $CO_2$ laser corresponds to the "second laser" used in the "separation step" (step S130) in the first manufacturing method.

The irradiation conditions for $CO_2$ laser were as follows:
Output power Q=38.7 W,
Spot diameter $\phi$=3 mm, and
Scan speed v=30 mm/sec.
Note that the spot diameter was defined as a width of a machining trace that was generated when an acrylic plate with a thickness of 5 mm was irradiated with laser light of the second laser with an output power of 38.7 W and a laser scan speed of 70 mm/second. For this reference, the distance between a laser collecting lens and the acrylic plate is made greater than a distance at which the spot diameter is the smallest, such that a focal point is deviated from a surface of the acrylic plate. For other spot diameters, the spot diameter is also defined as a width of a machining trace generated by irradiating an acrylic plate with a thickness of 5 mm with laser light of a laser with a predetermined output power and a predetermined scan speed.

Thus, a sample for evaluation was manufactured.
(Evaluation)

Using the sample manufactured by the aforementioned method (in the following, referred to as a "sample according to Example 1"), the following evaluation was performed.

(Evaluation of Water Repellency of Organic Film)

A water repellency of a surface of the organic film of the sample according to Example 1 was evaluated. The evaluation of the water repellency was performed by dropping a water droplet with a volume of 1 μL to 3 μL on the organic film, and measuring a contact angle of the water droplet. For the measurement, a contact angle meter DMo-701 by Kyowa Interface Science Co., Ltd. was used.

The evaluation was performed at two sites: at an approximately central portion of the organic film (in the following, referred to as a "central region"), and at a region of the organic film that is irradiated with laser light of $CO_2$ laser (in the following, referred to as a "target irradiated region").

As a result of measurement, at the central region, due to a strong water repellency, a water droplet was repelled and a contact angle could not be measured. At the target irradiated region of the organic film, the contact angle exhibited a sufficiently great value, 113.2°.

Thus, it was confirmed that, in the sample according to Example 1, even in the $CO_2$ laser irradiated region, the function of the organic film was not damaged.

(XPS Analysis for Organic Film)

Next, in the sample according to Example 1, the analysis of the X-ray photoelectron spectroscopy (XPS) for the organic film was performed. The analysis was performed at a predetermined interval from the target irradiated region of the organic film, along the central region of the organic film. The measurement was performed by using an X-ray photoelectron spectrometric analysis device Quantera SXM by Ulvac-Phi, Incorporated, with a probe diameter of 2 mmφ, a measurement time of 0.2 minutes/cycle, a pass energy of 224.0 eV, a step energy of 0.4 eV, and a sample angle of 45°.

Figure 15:
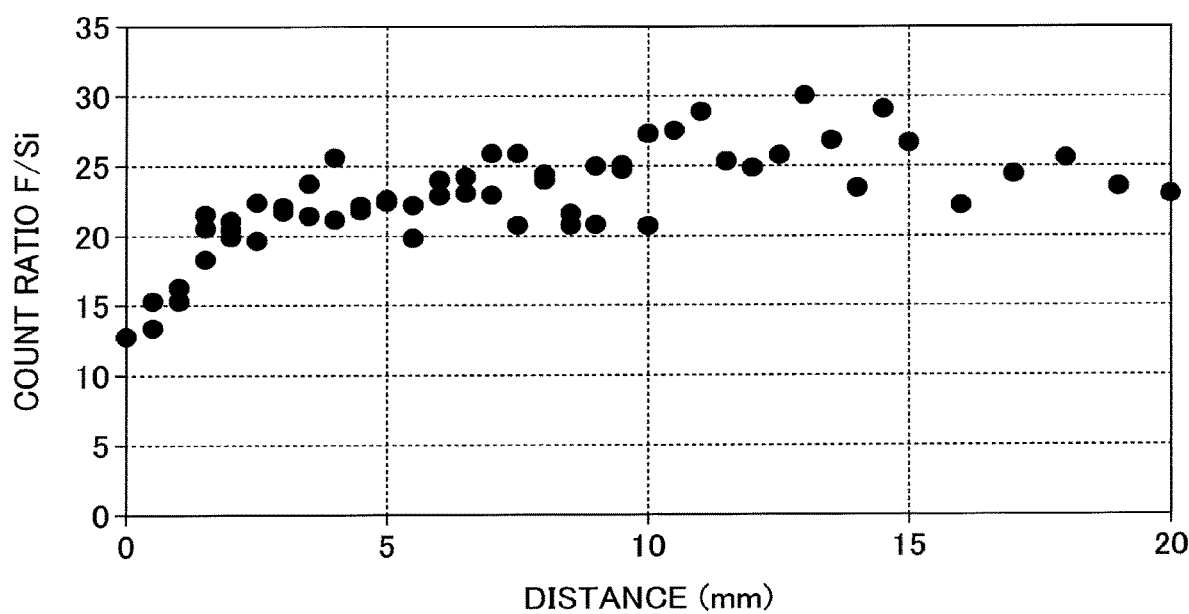
FIG. 15 is a diagram depicting an example of a result of an XPS analysis for an organic film of a sample according to Example 1.

FIG. 15 shows an example of a result of the XPS analysis.

In FIG. 15, a horizontal axis represents a distance from the target irradiated region of the organic film, and a point where the distance is zero corresponds to the target irradiated region of the organic film. That is, the horizontal axis represents a distance from the target irradiated region in a direction of a line connecting the target irradiated region and the central region of the organic film. A vertical axis represents a ratio of count numbers for fluorine (F) to silicon (Si), F/Si.

As shown in FIG. 15, the ratio of count numbers, F/Si, was the lowest at around a point where the distance was zero (12.8). FIG. 15 shows that as the distance increases, the ratio tends to gradually increase. It was found from FIG. 15 that, with respect to the distance exceeding 4 mm, the ratio F/Si exhibited a value of 25.9 as an average within a range from a distance of 10 to a distance of 20.

Thus, even at the position where the distance was zero, the ratio F/Si was not zero. Then, it was confirmed that in the sample according to Example 1, even in the object irradiation region, the organic film was present.

In the following, the count number for fluorine at the target irradiated region is expressed by $I_{AP}(F)$, and the count number for silicon is expressed by $I_{AP}(Si)$, and a ratio of the count numbers $I_{AP}(F)/I_{AP}(Si)$ is expressed by $R_{AP}$. Moreover, the count number for fluorine at the central region is expressed by $I_{AC}(F)$, and the count number for silicon is expressed by $T_{AC}(Si)$, and a ratio of the count numbers $I_{AC}(F)/I_{AC}(Si)$ is expressed by $R_{AC}$.

Based on the aforementioned expression, a result of calculation showed that for the sample according to Example 1, the value of the ratio $R_{AP}/R_{AC}$ was 0.49.

Note that when the separation of a glass article from a glass plate is assumed, it is clear that the ratio $R_{AP}/R_{AC}$ substantially corresponds to the aforementioned ratio $R_{MP}/R_{MC}$.

Examples 2 to 5

Using the same method as in Example 1, samples for evaluation were manufactured.

However, in Examples 2 to 5, irradiation conditions for $CO_2$ laser were different from the irradiation conditions in Example 1.

Using the obtained samples (in the following, referred to as "samples according to Examples 2 to 5"), the same evaluation as in Example 1 was performed.

Examples 11 and 12

Using the same method as in Example 1, samples for evaluation were manufactured.

However, in Examples 11 and 12, irradiation conditions for $CO_2$ laser were different from the irradiation conditions in Example 1.

Using the obtained samples (in the following, referred to as "samples according to Examples 11 and 12"), the same evaluation as in Example 1 was performed.

TABLE 1, in the following, shows the irradiation conditions for $CO_2$ laser in the aforementioned examples, and results of evaluation obtained in the samples according to the examples as a whole.

greater than 100° was obtained (See "TAP" column of the contact angle (degrees) in TABLE 1) also in the target irradiated region of the sample.

In this way, it was confirmed that when the samples according to Examples 1 to 5 are irradiated with laser light of $CO_2$ laser, the organic film was not appreciably damaged or lost. Thus, it can be said that after performing the separation process, a glass article can be separated properly in the first manufacturing method.

In each of the samples according to Examples 11 and 12, the ratio $R_{AP}/R_{AC}$ is less than 0.3, and it was found that the organic film remained in a small quantity within the $CO_2$ laser irradiated region. The result corresponds to the fact that the contact angle greatly decreases (less than 100°) in the target irradiated region of the sample.

In this way, in the case of assuming the first manufacturing method, it is considered that in the separation processing by the $CO_2$ laser irradiation with respect to the samples according to Examples 11 and 12, end portions of the organic film were damaged and lost, and a glass article could not be separated where the organic film was in the proper state.

When a value of a contact angle of the organic film with respect to a drop of water in the target irradiated region is $T_{AP}$, and a value of a contact angle of the organic film with respect to a drop of water in the central region is $T_{AC}$, a ratio of $T_{AP}$ to $T_{AO}$ was 0.90 or more for the samples according to Examples 2 to 5. For the samples according to Examples 11 and 12, the ratio of $T_{AP}$ to $T_{AO}$ was less than 0.90.

Note that when the separation of a glass article from a glass plate is assumed, it is clear that the ratio $T_{AP}/T_{AC}$ substantially corresponds to the aforementioned ratio $T_{MP}/T_{MC}$.

Example 15

In the aforementioned examples, in the first manufacturing method, step S110 was not performed. Then, in order to confirm that a glass article can be separated from the glass plate by implementing the first manufacturing method, the following experiment was performed.

TABLE 1

| example | $CO_2$ laser irradiation conditions | | | contact angle of organic film (degrees) | | ratio | XPS analysis for organic film | | ratio |
|---|---|---|---|---|---|---|---|---|---|
| | output power Q (W) | spot diameter φ (mm) | scan speed v (mm/s) | $T_{AP}$ | $T_{AC}$ | $T_{AP}/T_{AC}$ | $R_{AP}$ | $R_{AC}$ | $R_{AP}/R_{AC}$ |
| 1 | 38.7 | 3 | 30 | 113.2 | cannot be measured | — | 12.8 | 25.0 | 0.49 |
| 2 | 38.7 | 3 | 50 | 108.3 | 113.1 | 0.96 | 11.3 | 15.3 | 0.74 |
| 3 | 38.7 | 3 | 70 | 112.4 | 113.2 | 0.99 | — | — | — |
| 4 | 66.7 | 3 | 80 | 105.3 | 113.3 | 0.93 | 6.9 | 17.8 | 0.39 |
| 5 | 95.1 | 3 | 250 | 111.8 | 113.5 | 0.99 | 14.9 | 18.1 | 0.82 |
| 11 | 95.1 | 3 | 90 | 58.1 | 113.1 | 0.51 | 2.4 | 18.2 | 0.13 |
| 12 | 95.1 | 3 | 130 | 99.3 | 114 | 0.87 | 5.5 | 18.8 | 0.29 |

From the results shown in TABLE 1, it was found that in each of Examples 1 to 5, the ratio $R_{AP}/R_{AC}$ exceeds 0.3, and a substantially considerable amount of organic film remained even in the region of the sample which had been irradiated with laser light of $CO_2$ laser. The above-described result corresponds to a result that a great contact angle The first main surface of the glass plate was irradiated with laser light of the first laser, to form a plurality of in-plane void regions and internal void arrays corresponding to the in-plane void regions in the glass plate. For the glass plate, a glass plate, that was the same as the glass plate used in Example 1, was used.

For a laser device of the first laser, an ultrashort pulse laser device (number of pulses is three) by ROFIN-SINAR Laser GmbH (Germany) that can emit short pulsed laser light of a picosecond order was used. An output power of the laser was set to 90% of the rated value (50 W). A frequency of one burst of the laser was 60 kHz, a pulse width was 15 picoseconds, and a width of one burst was 66 nanoseconds.

Each in-plane void was set to be a "single line in-plane void region". Moreover, the arrangement pattern of the in-plane void regions was set to be an approximately latticed shape. A distance between centers of the in-plane voids configuring the in-plane void region was set to fall within a range of about 4 to 6 μm.

Next, under the same conditions as the irradiation conditions of the $CO_2$ laser in Example 1, the laser light of a $CO_2$ laser was emitted along the in-plane void region.

Note that, in Example 15, the deposition of an organic film was not performed. However, from the result of evaluation for the sample according to Example 1, it was confirmed that the organic film was almost free from damage even after the $CO_2$ laser irradiation.

After the $CO_2$ laser irradiation, a glass article could be separated from the glass plate.

Next, the irradiation conditions of the $CO_2$ laser were changed to the conditions employed in Examples 2 to 5, and the same experiment was performed. As a result, it was confirmed that in any of the $CO_2$ laser irradiation conditions, a glass article can be separated from the glass plate after the $CO_2$ laser irradiation.

Practical Example 2

In the following description, Examples 21 to 25, and Examples 31 to 34 illustrate practical examples, and Examples 26, 35, and 36 illustrate comparative examples.

Example 21

In order to prepare a sample for evaluation, step S110 to step S130 in the first manufacturing method were performed.

First, for a glass plate, a glass plate that is the same as the glass plate used in the practical example 1 was prepared. Dimensions of the glass plate were 100 mm (vertical)×100 mm (horizontal)×0.8 mm (thickness).

Next, one of main surfaces of the glass plate (first main surface) was irradiated with laser light of the first laser under the following condition, to form a plurality of in-plane void regions and internal void arrays in the glass plate.

For the laser device of the first laser, an ultrashort pulse laser device (number of pulses is three) by ROFIN-SINAR Laser GmbH (Germany) that can emit short pulsed laser light of a picosecond order was used. An output power of the laser was set to 90% of the rated value (50 W). A frequency of one burst of the laser was 60 kHz, a pulse width was 15 picoseconds, and a width of one burst was 66 nanoseconds.

Each in-plane void was set to be a "single line in-plane void region". Moreover, the arrangement pattern of the in-plane void regions was set to be an approximately latticed shape. A distance between centers of the in-plane voids configuring the in-plane void region was set to fall within a range of about 4 μm to 6 μm.

Next, an antireflection film and an organic film were deposited on the whole of the first main surface of the glass plate in this order.

The antireflection film had a four layer structure of $Nb_2O_5$ (target thickness was 15 nm)/$SiO_2$ (target thickness was 35 nm)/$Nb_2O_5$ (target thickness was 120 nm)/$SiO_2$ (target thickness was 80 nm), and was deposited by using a sputtering method.

The organic film was a fingerprint adhesion prevention film (Afluid S550 by AGC Inc.), and was deposited by using an evaporation method. A target thickness of the organic film was 4 nm.

Next, the first main surface of the glass plate was irradiated with laser light of a $CO_2$ laser. The $CO_2$ laser corresponds to the "second laser" used in the "separation step" (step S130) in the first manufacturing method.

The irradiation conditions for the $CO_2$ laser were as follows:

Output power Q=38.7 W,

Spot diameter ϕ=3 mm.

Scan speed v=50 mm/sec.

Note that the spot diameter was defined as a width of a machining trace that was generated when an acrylic plate with a thickness of 5 mm was irradiated with laser light of the second laser with an output power of 38.7 W and a laser scan speed of 70 mm/second.

After the $CO_2$ laser irradiation, a glass article was separated from the glass plate. One of the glass articles obtained as above was collected and was used for a sample for evaluation as follows (referred to as a "sample according to Example 21").

Examples 22 to 25

Samples for evaluation were manufactured using the same method as in Example 21.

However, in Examples 22 to 25, irradiation conditions for the $CO_2$ laser were different from the irradiation conditions in Example 21.

The obtained samples will be referred to as "samples according to Examples 22 to 25".

Example 26

A sample for evaluation was manufactured using the same method as in Example 21.

However, in Example 26, irradiation conditions for the $CO_2$ laser were different from the irradiation conditions in Example 21.

The obtained sample will be referred to as a "sample according to Example 26".

Example 31

A sample for evaluation was manufactured using the same method as in Example 21.

However, in Example 31, an organic film arrangement on the first surface of the glass plate was different from the arrangement of the organic film in the case of Example 21.

Specifically, the organic film was a fingerprint adhesion prevention film (Afluid S550 by AGC Inc.) that was deposited by using a spray method. A target thickness of the organic film was 5 nm.

After the $CO_2$ laser irradiation, a glass article was separated from the glass plate. One of the glass articles obtained as above was collected and was used for a sample for evaluation as follows (referred to as a "sample according to Example 31").

Examples 32 to 34

Samples for evaluation were manufactured using the same method as in Example 31.

However, in Examples 32 to 34, irradiation conditions for $CO_2$ laser were different from the irradiation conditions in Example 31.

The obtained samples will be referred to as "samples according to Examples 32 to 34".

However, in the practical example 2, the position within the laser cutting end face by 500 μm (corresponding to the aforementioned "target irradiated region") was regarded as the end face, and XPS analysis was performed at a predetermined interval from the position along the central portion of the organic film.

In the following, the count number for fluorine at the target irradiated region is expressed by $I_{AP}(F)$, and the count number for silicon is expressed by $I_{AP}(Si)$, and a ratio of the count numbers $I_{AP}(F)/I_{AP}(Si)$ is expressed by $R_{AP}$. Moreover, the count number for fluorine at the central region is expressed by $I_{AC}(F)$, and the count number for silicon is expressed by $I_{AC}(Si)$, and a ratio of the count numbers $I_{AC}(F)/I_{AC}(Si)$ is expressed by $R_{AC}$.

TABLE 2, in the following, shows the irradiation conditions for the $CO_2$ laser in Examples 21 to 26, and results of evaluation obtained in the samples according to Examples 21 to 26 as a whole.

TABLE 2

| example | $CO_2$ laser irradiation conditions | | | contact angle of organic film (degrees) | | | XPS analysis for organic film | | |
|---|---|---|---|---|---|---|---|---|---|
| | output power Q (W) | spot diameter φ (mm) | scan speed v (mm/s) | $T_{AP}$ | $T_{AC}$ | ratio $T_{AP}/T_{AC}$ | $R_{AP}$ | $R_{AC}$ | ratio $R_{AP}/R_{AC}$ |
| 21 | 38.7 | 3 | 50 | 111.6 | 111.7 | 1.00 | 4.1 | 4.5 | 0.93 |
| 22 | 38.7 | 3 | 70 | 112.6 | 112.9 | 1.00 | 4.3 | 4.5 | 0.96 |
| 23 | 66.7 | 3 | 80 | 112.3 | 112.9 | 0.99 | 3.2 | 4.5 | 0.73 |
| 24 | 95.1 | 3 | 250 | 107.3 | 107.7 | 1.00 | 3.3 | 4.5 | 0.75 |
| 25 | 95.1 | 3 | 130 | 89.5 | 106.2 | 0.84 | 2.0 | 4.5 | 0.44 |
| 26 | 95.1 | 3 | 90 | 80.0 | 107.7 | 0.74 | 0.2 | 4.5 | 0.04 |

Examples 35 and 36

Samples for evaluation were manufactured using the same method as in Example 31.

However, in Examples 35 and 36, irradiation conditions for $CO_2$ laser were different from the irradiation conditions in Example 31.

The obtained samples will be referred to as "samples according to Examples 35 and 36".

(Evaluation)

Using the samples manufactured by the aforementioned method, the following evaluation was performed.

(Evaluation of Water Repellency of Organic Film)

Water repellencies of surfaces of the organic films of the samples according to Examples 21 to 26 and 31 to 36 were evaluated. The evaluation method of the water repellency was the same as in the practical example 1.

However, in the practical example 2, the water repellency was measured at the central portion of the organic film on the first side of the sample, and at a position that was regarded as the end face located within one of the laser cutting end faces of the organic film by 500 μm (corresponding to the aforementioned "target irradiated region"). The contact angles of the positions are indicated by "TAP" and "TAC".

(XPS Analysis for Organic Film)

In the samples, the analysis for the X-ray photoelectron spectroscopy (XPS) for the organic film was performed. The analysis method was the same as in the practical example 1.

From the results shown in TABLE 2, it was found that in each of Examples 21 to 25, the ratio $R_{AP}/R_{AC}$ exceeds 0.3, and a substantially considerable amount of organic film remained even in the region of the sample which had been irradiated with laser light of $CO_2$ laser. The above-described result corresponds to a result that in the case of Examples 21 to 25, a great contact angle greater than 89.5° was obtained also in the target irradiated region of the sample.

In this way, it was confirmed that when the samples according to Examples 21 to 25 are irradiated with laser light of $CO_2$ laser, the organic film was not appreciably damaged or lost. Thus, it can be said that after performing the separation process, a glass article can be separated properly in the first manufacturing method.

In the sample according to Example 26, the ratio $R_{AP}/R_{AC}$ was significantly less than 0.3, and it was found that the organic film remained in a small quantity within the $CO_2$ laser irradiation region. The result corresponds to the fact that the contact angle greatly decreases (less than 80°) in the target irradiated region of the sample.

TABLE 3, in the following, shows the irradiation conditions for $CO_2$ laser in the samples according to Examples 31 to 36, and results of evaluation obtained in the samples according to Examples 31 to 36 as a whole.

TABLE 3

| example | CO$_2$ laser irradiation conditions | | | contact angle of organic film (degrees) | | ratio | XPS analysis for organic film | | ratio |
|---|---|---|---|---|---|---|---|---|---|
| | output power Q (W) | spot diameter φ (mm) | scan speed v (mm/s) | $T_{AP}$ | $T_{AC}$ | $T_{AP}/T_{AC}$ | $R_{AP}$ | $R_{AC}$ | $R_{AP}/R_{AC}$ |
| 31 | 38.7 | 3 | 50 | 115.9 | 114.9 | 1.01 | 9.0 | 10.4 | 0.86 |
| 32 | 38.7 | 3 | 70 | 113.0 | 113.8 | 0.99 | 6.8 | 10.4 | 0.65 |
| 33 | 66.7 | 3 | 80 | 112.7 | 113.8 | 0.99 | 5.6 | 10.4 | 0.54 |
| 34 | 95.1 | 3 | 250 | 113.9 | 113.9 | 1.00 | 10.3 | 10.4 | 0.99 |
| 35 | 95.1 | 3 | 90 | 73.2 | 113.9 | 0.64 | 0.0 | 10.4 | 0.00 |
| 36 | 95.1 | 3 | 130 | 88.9 | 112.6 | 0.79 | 2.1 | 10.4 | 0.20 |

From the results shown in TABLE 3, it was found that in each of Examples 31 to 34, the ratio $R_{AP}/R_{AC}$ exceeds 0.3, and a substantially considerable amount of organic film remained even in the region of the sample which had been irradiated with laser light of CO$_2$ laser. The above-described result corresponds to a result that in Examples 31 to 34 a great contact angle greater than 100° was obtained in the target irradiated region of the sample.

In this way, it was confirmed that when the samples according to Examples 31 to 34 are irradiated with laser light of CO$_2$ laser, the organic film was not appreciably damaged or lost. Thus, it can be said that after performing the separation process, a glass article can be separated properly in the first manufacturing method.

In the samples according to Examples 35 and 36, the ratio $R_{AP}/R_{AC}$ was significantly less than 0.3, and it was found that the organic film remained in a small quantity within the CO$_2$ laser irradiation region. The result corresponds to the fact that the contact angle decreases (less than or equal to 88.9°) in the target irradiated region of the sample.

REFERENCE SIGNS LIST 110 glass plate
112 first main surface
114 second main surface
116 end face
130,131,132 in-plane void region
138 surface void
138A,138B surface void array
150 internal void array
158 void
160a to 160c glass pieces
165 virtual end face
170 organic film
300 first glass article
302 first main surface
304 second main surface
306-1 to 306-4 end face
320 glass substrate
322 first main surface
324 second main surface
326 end face
370 organic film
372 end face of organic film

What is claimed is:

1. A manufacturing method of a glass article having an organic film, the manufacturing method comprising:

irradiating a first main surface of a glass plate having the first main surface and a second main surface, opposite each other, with a laser light of a first laser,
to form an in-plane void region, in which a plurality of voids are arrayed, on the first main surface, and
to form a plurality of internal void arrays, each including a void or two or more voids arrayed from the in-plane void region to the second main surface, in the glass plate;
depositing the organic film on the first main surface or the second main surface of the glass plate; and
irradiating and scanning the first main surface or the second main surface of the glass plate, on which the organic film was deposited, with a laser light of a second laser that is different from the first laser, along the in-plane void region or a neighborhood of the in-plane void region,
to separate one or more glass articles from the glass plate along the in-plane void region,
wherein, in the irradiating and scanning, the first main surface or the second main surface is irradiated with the laser light of the second laser so that
when a central portion of a surface of the organic film of the one or more glass articles separated from the glass plate on the first main surface side or the second main surface side is MC, and a point in an end face of the glass article in a top view is MP, wherein MP is a point in an end face other than intersection portions of two adjacent sides of a polygon,
at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and
at the central portion MC, a count number for fluorine and a count number for silicon obtained by the X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$,
a ratio of the ratio $R_{MP}$ to the ratio $R_{MC}$ is 0.3 or more.

2. The manufacturing method of the glass article according to claim 1, further comprising:
performing a chemical strengthening process for the glass plate after the irradiating and before the depositing.

3. The manufacturing method of the glass article according to claim 1,
wherein an interval between adjacent voids in the in-plane void region falls within a range from 3 μm to 10 μm.

4. The manufacturing method of the glass article according to claim 1, wherein the organic film is configured of a polymer having a siloxane linkage as a main skeleton and containing fluorine (F).

5. The manufacturing method of the glass article according to claim 1,
wherein, in the irradiating and scanning, the first main surface is irradiated with the laser light of the second laser so that
when a value of a contact angle of the organic film with respect to a drop of water at the point MP is $T_{MP}$, and a value of a contact angle of the organic film with respect to a drop of water at the central portion MC is $T_{MC}$, a ratio of the value of the contact angle $T_{MP}$ to the value of the contact angle $T_{MC}$ is 0.90 or more.

6. A manufacturing method of a glass article having an organic film, the manufacturing method comprising:
depositing the organic film on a first main surface of a glass plate having the first main surface and a second main surface, opposite each other;
irradiating the first main surface of the glass plate with a laser light of a first laser,
to form an in-plane void region, in which a plurality of voids are arrayed, on the first main surface, and
to form a plurality of internal void arrays, each including a void or two or more voids arrayed from the in-plane void region to the second main surface, in the glass plate; and
irradiating and scanning the first main surface of the glass plate with a laser light of a second laser that is different from the first laser, along the in-plane void region or a neighborhood of the in-plane void region,
to separate one or more glass articles from the glass plate along the in-plane void region,
wherein, in the irradiating and scanning, the first main surface is irradiated with the laser light of the second laser so that
when a central portion of a surface of the organic film of the one or more glass articles separated from the glass plate on the first main surface side is MC, and a point in an end face of the glass article in a top view is MP, wherein MP is a point in an end face other than intersection portions of two adjacent sides of a polygon,
at the point MP, a count number for fluorine and a count number for silicon obtained by an X-ray photoelectron spectroscopy (XPS) are $I_{MP}(F)$ and $I_{MP}(Si)$, respectively, and $R_{MP}$ is a ratio of the count number $I_{MP}(F)$ to the count number $I_{MP}(Si)$, and
at the central portion MC, a count number for fluorine and a count number for silicon obtained by the X-ray photoelectron spectroscopy (XPS) are $I_{MC}(F)$ and $I_{MC}(Si)$, respectively, and $R_{MC}$ is a ratio of the count number $I_{MC}(F)$ to the count number $I_{MC}(Si)$,
a ratio of the ratio $R_{MP}$ to the ratio $R_{MC}$ is 0.3 or more.

* * * * *